(12) United States Patent
Pham

(10) Patent No.: US 9,925,904 B2
(45) Date of Patent: Mar. 27, 2018

(54) ADJUSTMENT APPARATUS FOR CONTAINER INSTALLATION

(71) Applicant: SCHLUMBERGER TECHNOLOGY CORPORATION, Sugar Land, TX (US)

(72) Inventor: Hau Nguyen-Phuc Pham, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 242 days.

(21) Appl. No.: 14/567,831

(22) Filed: Dec. 11, 2014

(65) Prior Publication Data

US 2016/0167559 A1   Jun. 16, 2016
US 2017/0210269 A9   Jul. 27, 2017

Related U.S. Application Data

(60) Provisional application No. 61/915,291, filed on Dec. 12, 2013.

(51) Int. Cl.
*B60P 1/32*   (2006.01)
*B60P 1/64*   (2006.01)

(52) U.S. Cl.
CPC .............. *B60P 1/32* (2013.01); *B60P 1/6418* (2013.01)

(58) Field of Classification Search
CPC ....... B65G 67/30; B65G 67/40; B60P 1/6418; B60P 1/64; B60P 3/40; B60P 1/26; B60P 1/32; B60P 3/2245; B28C 7/0495; B28C 9/0418; B65D 90/006

See application file for complete search history.

(56) References Cited

U.S. PATENT DOCUMENTS

| | | | | |
|---|---|---|---|---|
| 2,606,676 A | * | 8/1952 | Dempster | B60P 1/64 298/22 D |
| 3,547,291 A | * | 12/1970 | Lonsdale | B60P 1/64 414/498 |
| 6,752,467 B1 | * | 6/2004 | Palrose | B60P 1/34 298/11 |

FOREIGN PATENT DOCUMENTS

| WO | 2014028317 A1 | 2/2014 |
|---|---|---|
| WO | 2014028319 A1 | 2/2014 |
| WO | 2014028321 A1 | 2/2014 |

\* cited by examiner

*Primary Examiner* — Glenn F Myers
(74) *Attorney, Agent, or Firm* — Michael L. Flynn; Rachel E. Greene; Robin Nava

(57) ABSTRACT

An apparatus comprising a chassis, a mast movably coupled with the chassis, a first actuator operable to pivot the mast with respect to the chassis along a substantially vertical plane, and a second actuator operable to move the mast in a lateral direction with respect to the chassis along a substantially horizontal plane. The mast may support an oilfield material container. By pivoting the mast, the first actuator may be operable to pivot the oilfield material container with respect to the chassis along a substantially vertical plane. By moving the mast, the second actuator may be operable move the oilfield material container in a lateral direction with respect to the chassis along a substantially horizontal plane.

7 Claims, 20 Drawing Sheets

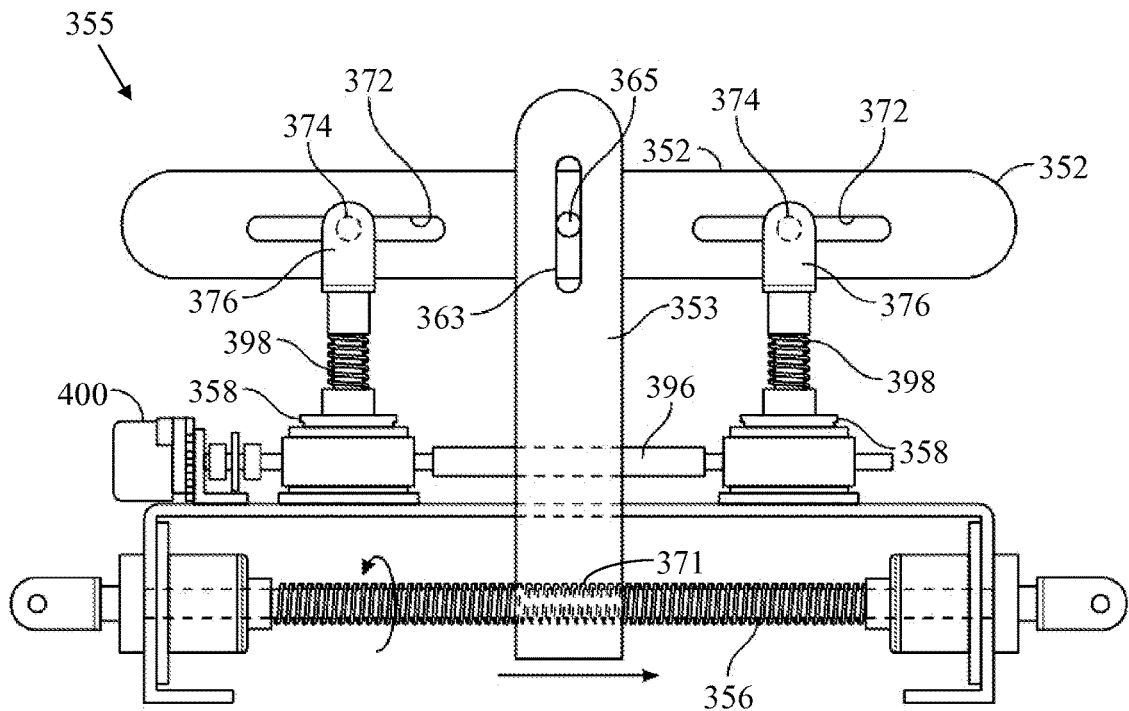
FIG. 18
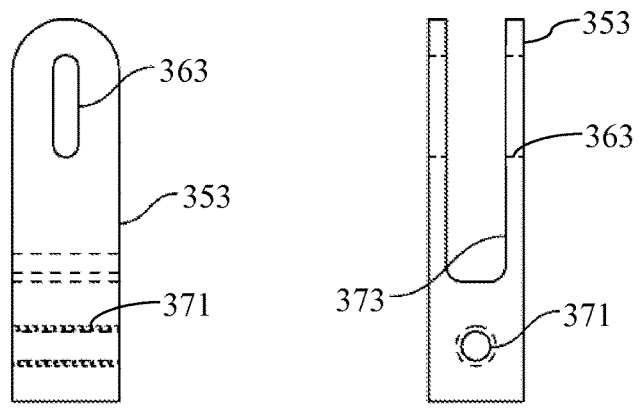
FIG. 19     FIG. 20

ADJUSTMENT APPARATUS FOR CONTAINER INSTALLATION

CROSS-REFERENCE TO RELATED APPLICATIONS

This application claims the benefit of U.S. Provisional Application No. 61/915,291, entitled "MOBILE ERECTOR ASSEMBLY," filed Dec. 12, 2013, the entire disclosure of which is hereby incorporated herein by reference.

BACKGROUND OF THE DISCLOSURE

To facilitate the recovery of hydrocarbons from oil and gas wells, subterranean formations surrounding such wells may be hydraulically fractured. Hydraulic fracturing may be utilized to create cracks in subsurface formations to permit oil and/or gas to move toward the well. The formation is fractured by introducing a specially engineered fluid, sometimes referred to as a fracturing fluid or slurry, at a high pressure and high flow rate into the formation through one or more wellbores. The fracturing fluid may be loaded with proppant, which are sized particles that may be mixed with liquid of the fracturing fluid to help form an efficient conduit for producing hydrocarbons from the formation to the wellbore. The proppant collects inside the fractures to prop open the fractures formed in the formation. The proppant may comprise naturally occurring sand grains or gravel, man-made proppants (e.g., fibers or resin-coated sand), high-strength ceramic materials (e.g., sintered bauxite), and/or other suitable materials.

At the wellsite, proppant and other fracturing fluid components are blended at a low-pressure side of the pumping system. The oilfield materials often are delivered from storage facilities to a blender by pneumatic systems, which employ air to convey the oilfield materials. Water and/or other liquids are then added, and the resulting fracturing fluid is delivered downhole under high pressure. Handling the proppant prior to blending may include transporting the proppant to the wellsite via trucks, then to holding silos or bins, and subsequently to the blending equipment. Prior to blending, the proppant handling and dispensing assemblies are assembled at the wellsite.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a chassis, a base movably coupled with the chassis, and a mast pivotably connected with the base and supporting an oilfield material container in a transport orientation. The apparatus also includes a first actuator operable to pivot the mast and the oilfield material container from the transport orientation to an operational orientation, and a second actuator operable to move the base, and thus the mast and the oilfield material container, relative to the chassis.

The present disclosure also introduces a method that includes connecting an oilfield material container to a mast that is pivotably connected with a base. The base is movably coupled with a chassis. The method also includes operating a first actuator to move the base, and thus the mast and the oilfield material container, relative to the chassis. The method also includes operating a second actuator to pivot the mast and the oilfield material container from a transport orientation to an operational orientation.

The present disclosure also introduces an apparatus that includes a chassis, a mast movably coupled with the chassis and supporting an oilfield material container, and a first actuator operable to pivot the mast, and thus the oilfield material container, with respect to the chassis in a substantially vertical plane. The apparatus also includes a second actuator operable to move the mast, and thus the oilfield material container, in a substantially horizontal plane.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 18 is an elevation view of a portion of another implementation of the apparatus shown in FIG. 7 according to one or more aspects of the disclosure.

FIG. 19 is a side view of a portion of the apparatus shown in FIG. 18.

FIG. 20 is a side view of the apparatus shown in FIG. 19.

DETAILED DESCRIPTION

Figure 1:
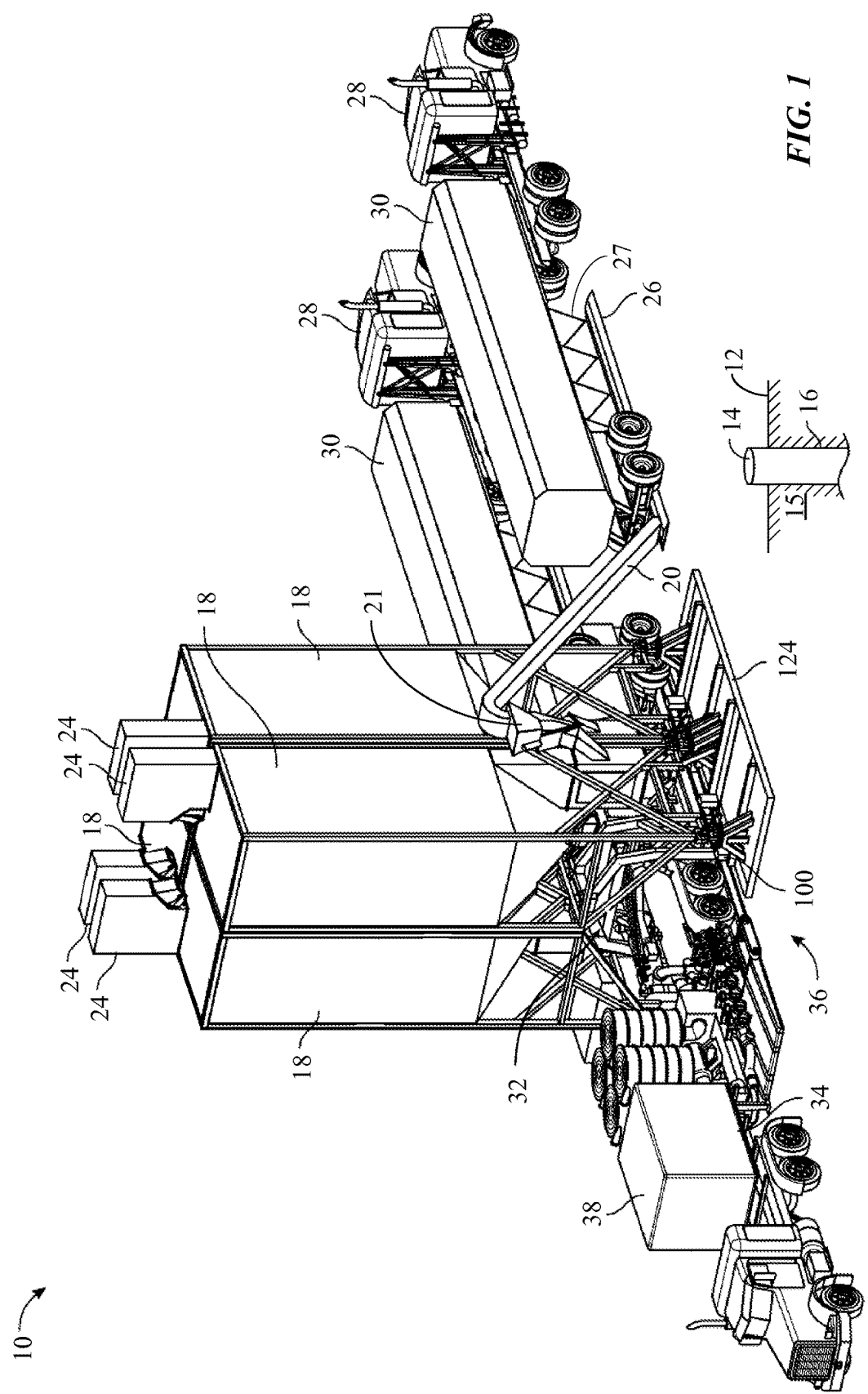
FIG. 1 is a perspective view of at least a portion of apparatus according to one or more aspects of the disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally introduces a system and methodology to facilitate handling of oilfield material using mobile structures. In some implementations, modular silos for holding the oilfield material may be transported to a wellsite by suitable trucks. The modular silos may be carried to the wellsite by a silo delivery system which may be coupled with an over-the-road truck before being erected and mounted in a substantially upright (i.e., vertical) position on a mobile support structure (MSS). Once transported to the wellsite, the modular silos may be erected onto the MSS via operation of a mobile erector assembly of the silo delivery system. In the context of the present disclosure, a truck refers to a transport vehicle, such as an articulated truck having a trailer. However, although not illustrated as such in the figures described below, the truck may also be a straight truck or other suitable truck operable to transport the modular silo over public roadways. The trailer, chassis, and/or other portion of the truck may include the mobile erector assembly operable to erect the modular silo in conjunction with mounting the modular silo on the MSS, such as via operation of various hydraulic cylinders, winches, and/or other actuator assemblies. In some implementations, the silo delivery system may include vertical and lateral (i.e., horizontal) displacement mechanisms, which may facilitate alignment of the modular silo with the MSS even where some vertical or horizontal misalignment is present. The MSS may permit the modular silo to be erected from its horizontal position, in which it may be transported by truck, to an upright position for mounting the modular silo on the MSS.

FIG. 1 is a perspective view of an example implementation of a proppant delivery system 10 operable for forming a slurry suitable for fracturing formations according to one or more aspects of the present disclosure. The proppant delivery system 10 may comprise various equipment, including vehicles, storage containers, material handling equipment, pumps, control systems, and other equipment designed to facilitate the fracturing process, including as described below and depicted in the accompanying figures. However, the implementation depicted in FIG. 1 and the remaining figures is an example, and many other implementations also fall within the scope of the present disclosure.

The proppant delivery system 10 is shown in position at a wellsite 12 having a well 14 with at least one wellbore 16 extending downward into a subterranean reservoir and/or formation 15. The proppant delivery system 10 may comprise an MSS 50 for supporting one or more modular silos 18, such as may be transported over-the-road by trucks able to operate on public roadways. The modular silos 18 may be transported and mounted onto the MSS 50 by a silo delivery system, which will be described in more detail below. The modular silos 18 may be utilized at the wellsite 12 to store oilfield material (not shown) such as a proppant, guar (utilized to increase the viscosity of a hydraulic fracturing fluid), and/or other suitable oilfield materials.

The modular silos 18 may receive oilfield material via one or more conveyors. For example, a trailer 30 may be positioned (e.g., backed up or otherwise driven by a tractor or other truck 28) over a first conveyor 26, such as a substantially horizontal belt or other conveyor positioned along the ground and operable to receive gravity-fed oilfield material from a chute or other outlet 27 of the trailer 30. The first conveyor 26 may transport the oilfield material to a second conveyor 20, which may transport the oilfield material to an intermediate hopper 21. A third conveyor 24 may then transport the oilfield material into a top of a corresponding modular silo 18. The third conveyor 24 may be integral to a corresponding modular silo 18, and is thus partially obscured from view in the example implementation depicted in FIG. 1.

The proppant delivery system 10 may include other conveyors, in addition to or instead of those depicted in FIG. 1. One or more of the conveyors 20, 24, 26 may operate by carrying the oilfield material, instead of blowing the oilfield material, such as may aid in avoiding dust generation and/or erosion of associated components. One or more of the conveyors 20, 24, 26 may also be at least partially enclosed, such as may also aid in reducing dust generation as the oilfield material is delivered from the trailers 30 and into the corresponding modular silos 18.

The first conveyor 26 may have a height (relative to the ground) of less than about twelve inches (or about 0.3 meters) or otherwise sufficient to permit the trailer 30 to be positioned over at least a portion of the conveyor 26. The length (along the ground) of the conveyor 26 may range between about eight feet (or about 2.4 meters) and about fifty feet (or about 15.2 meters). However, other dimensions are also within the scope of the present disclosure. The conveyors 20, 24, 26, and/or others may also be transported by truck.

The proppant delivery system 10 may also comprise other components, such as water tanks (not shown) for supplying water that is mixed with the oilfield material to form the hydraulic fracturing fluid (e.g., proppant slurry) that may then be pumped downhole into the wellbore 16 via operation of a pumping system (not shown). The tanks and/or pumping system may also be truck-mounted, skid-mounted, or otherwise transportable over-the-road. The pumping system may comprise one or more pumps, such as may be coupled to a common manifold (not shown) operable to deliver the hydraulic fracturing fluid into the wellbore 16.

The proppant delivery system 10 may also comprise a blending system 32 operable to blend oilfield material delivered from the modular silos 18 with water and/or other materials. The blending system 32 may be or comprise a portable blender, such as a truck-mounted or skid-mounted blender. In the example implementation depicted in FIG. 1, the blending system 32 is mounted on a truck chassis 34 and may be positioned (e.g., backed up) within a common area 36 adjacent the modular silos 18. The common area 36 may be located at least partially below the modular silos 18 and may be at least partially formed by the MSS 50. In such implementations, the MSS 50 may support the modular silos 18 over at least a portion of the common area 36. The proppant delivery system 10 may also comprise a control facility 38 and/or other components operable to facilitate a given fracturing operation.

Figure 2:
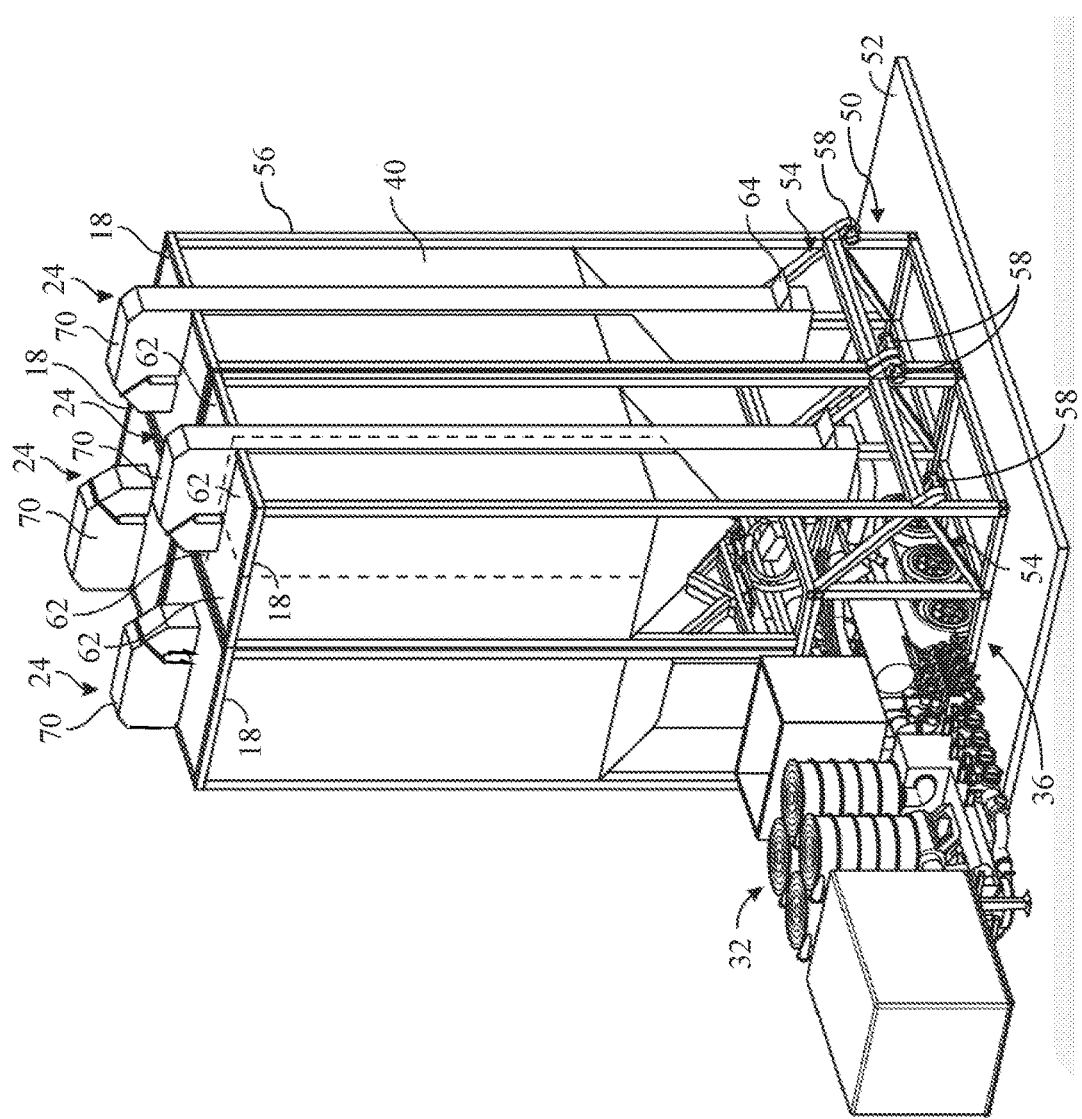
FIG. 2 is a perspective view of a portion of the apparatus shown in FIG. 1.

FIG. 2 is perspective view of a portion of the proppant delivery system 10 shown in FIG. 1, depicting the modular silos 18 coupled together into a cooperating unit. For example, four modular silos 18 may be coupled together on the MSS 50, which may be mounted on a base 52. The base 52 may also be referred to herein as a mat system. The base 52 may be placed on the ground or on a pad (not shown), which may comprise a variety of sizes and forms. For example, the pad may be a concrete pad, a gravel pad, a compacted aggregate pad, a pad constructed as a portable structure, and/or another suitable pad for supporting the modular silos 18. The base 52 may distribute weight of the modular silos 18 over the ground or the pad. The modular silos 18 may be mounted in a substantially upright (i.e., vertical) orientation on the MSS 50. The MSS 50 may comprise one or more silo-receiving regions 54 in which the individual modular silos 18 may be mounted in a substantially upright orientation. The MSS 50 may position the modular silos 18 at a predetermined height, such as may permit movement of the portable blending system 32 beneath the modular silos 18 within the common area 36 to receive a controlled outflow of the oilfield material from the modular silos 18. For example, the MSS 50 may permit the portable blending system 32 to be positioned (e.g., backed up) into position beneath the modular silos 18.

The modular silos 18 may each comprise a silo frame 56 supporting an outer housing 40, which defines an enclosed interior space for holding oilfield material. Depending on the fracturing operation, the oilfield material contained within each modular silo 18 may comprise naturally occurring sand grains or gravel, man-made proppants, resin coated sand, high-strength ceramic materials (e.g., sintered bauxite), other solids such as fibers, mica, mixtures of different sized oilfield materials, mixtures of different types of oilfield materials, and/or other suitable oilfield materials. One or more of the modular silos 18 may be internally divided into a plurality of compartments, such as may correspond to the quadrants 62, each holding different types of oilfield materials that may be selectively released from the modular silo 18 and blended via the blending system 32. Each conveyor 24 may be enclosed within each modular silo 18 and may lift the oilfield material from an inlet 64 (e.g., an inlet hopper), disposed at a lower portion of each modular silo 18, to an upper portion of each modular silo 18 for release into the enclosed interior space, such as through a vertical conveyor head 70. The conveyor head 70 may have a pivotable or otherwise moveable discharge, such as may be selectively controllable to deliver the oilfield material to the corresponding compartment 62 within the modular silo 18.

Figure 3:
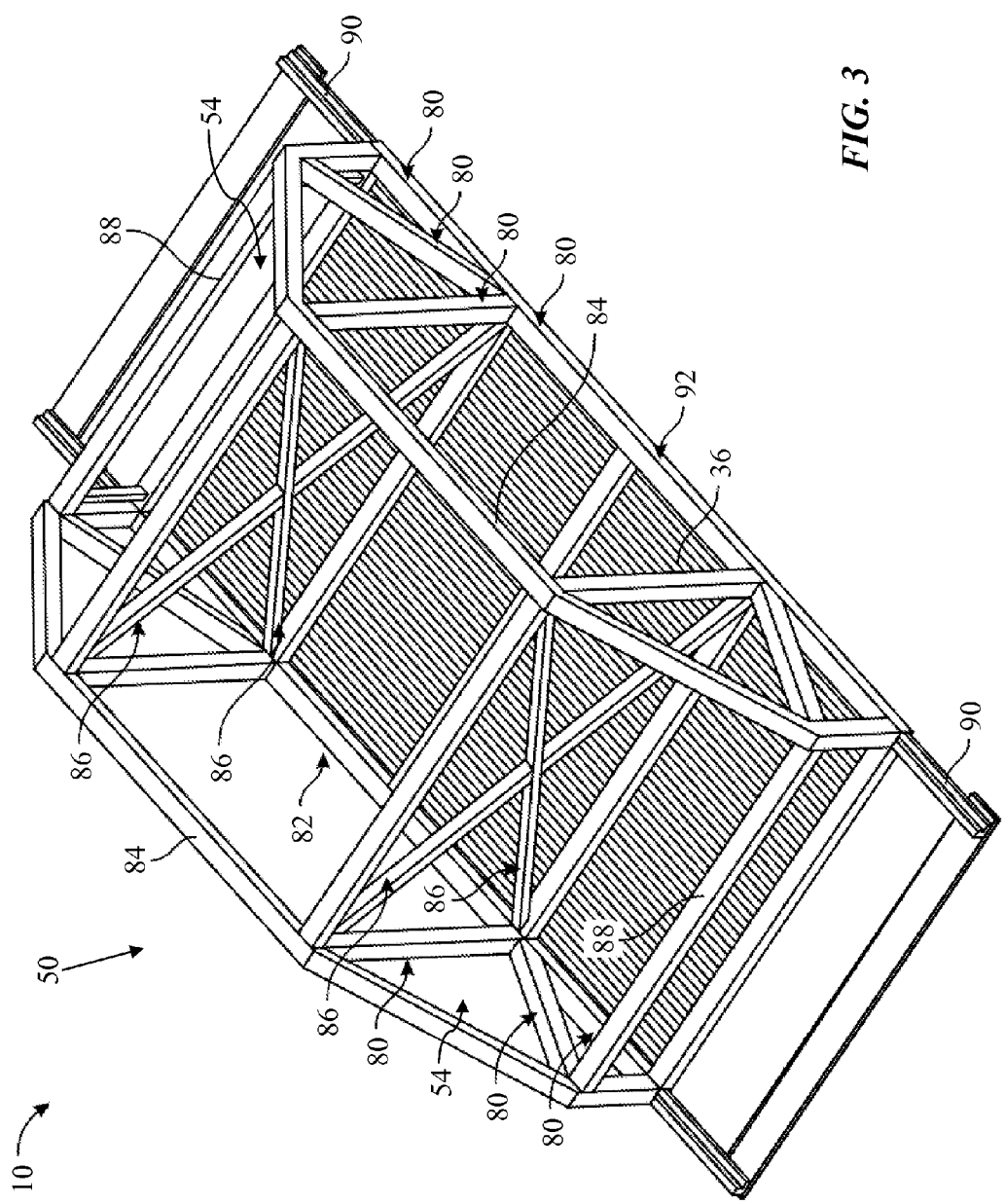
FIG. 3 is a perspective view of a portion of the apparatus shown in FIG. 1.

FIG. 3 is perspective view of a portion of the proppant delivery system 10 shown in FIG. 1, depicting an example implementation of the MSS 50 that comprises struts 80 connected by suitable fastening techniques, such as may utilize one or more welds, threaded fasteners, and/or other connection means. For example, in the example portion illustrated in FIG. 3, the struts 80 may collectively form two silo-receiving regions 54. However, the struts 80 may be connected in other configurations to form the MSS 50 having additional silo-receiving regions 54 for supporting additional modular silos 18.

Referring collectively to FIGS. 1, 2, and 3, the struts 80 may further be arranged to create the MSS 50 with a drive-under region or a passage 82, such as may provide a space for system equipment like the portable blending system 32. The passage may encompass at least a portion of the common area 36. The silo-receiving regions 54 of the MSS 50 may support the modular silos 18 in the upright position, which may permit metering equipment (not shown) to meter the outflow of the oilfield material into the portable blending system 32 when the portable blending system 32 is positioned within the passage 82. Upper struts 84 may be operable to couple the silo-receiving regions 54 and to provide support for at least a portion of the modular silos 18. The upper struts 84 may be disposed at a predetermined height to permit the truck-mounted portable blending system 32 to be positioned (e.g., backed up) within the passage 82. In other implementations of the MSS 50, the upper struts 84 may be split and supported by additional vertical struts to facilitate separation of the silo-receiving regions 54. For example, separate silo-receiving regions 54 may permit individual modular silos 18 or groups of modular silos 18 to be separated, such as to provide a space through which the portable blending system 32 and/or other equipment may be moved between the separated modular silos 18.

The MSS 50 may further comprise cross struts 86, which may be included throughout the MSS 50 to enhance the structural strength of the MSS 50. The MSS 50 may also comprise pivot struts 88 to which pivot connectors may be attached, as described below. During erection of each modular silo 18 from the substantially lateral (i.e., horizontal) or transportation configuration to the substantially upright (i.e., vertical) or operational configuration, as is described below, each modular silo 18 may initially be engaged with and then pivoted against the pivot struts 88 of the MSS 50. In some applications, the pivot struts 88 may be located at a height substantially matching corresponding pivot connectors 58 of the modular silo frame 56 when the modular silo 18 is mounted in the transportation configuration on a suitable over-the-road truck 28.

Referring again to FIG. 3, the MSS 50 may comprise or connect with at least one expandable base 90, which may stabilize the MSS 50 and the modular silos 18 when mounted in the operational configuration on the MSS 50. The expandable bases 90 may be movably connected with a base portion 92 of the MSS 50, wherein the expandable bases 90 may be slidably received within the base portion 92, such as may facilitate movement of the base portion 92 between a retracted position and an extended position to increase the stability of the MSS 50. The expandable bases 90 may be extended and contracted by one or more suitable actuators (not shown), including hydraulic actuators, such as hydraulic cylinders, electric actuators, such as stepping motors, and/or other actuators that may operate a screw coupled to the expandable bases 90. The expandable bases 90 may also be extended and contracted by mechanical actuators, or may be manually extended and contracted. Additionally, transition of the expandable bases 90 between the extended and contracted positions may be facilitated by other mechanisms or other members, such as hinges, pivots, couplers, and the like, which may facilitate quick connection and disconnection of the expandable bases 90, among other suitable mechanisms. The number and orientation of the expandable bases 90 may also vary according to the parameters of a given application.

Returning to FIG. 1, the proppant delivery system 10 may include an MSS 100, shown in FIG. 1 and other figures, instead of the MSS 50 shown in FIGS. 2 and 3. However, the MSS 100 may comprise, be substantially similar to, and/or otherwise have one or more aspects in common with the MSS 50 shown in FIGS. 2 and/or 3. Accordingly, subsequent reference herein to the MSS 100 may also or instead refer to the MSS 50 shown in FIGS. 2 and 3, or both the MSS 50 and the MSS 100. Thus, the MSS 50 and the MSS 100 are hereafter referred to collectively as the MSS 100, where applicable.

Figure 4:
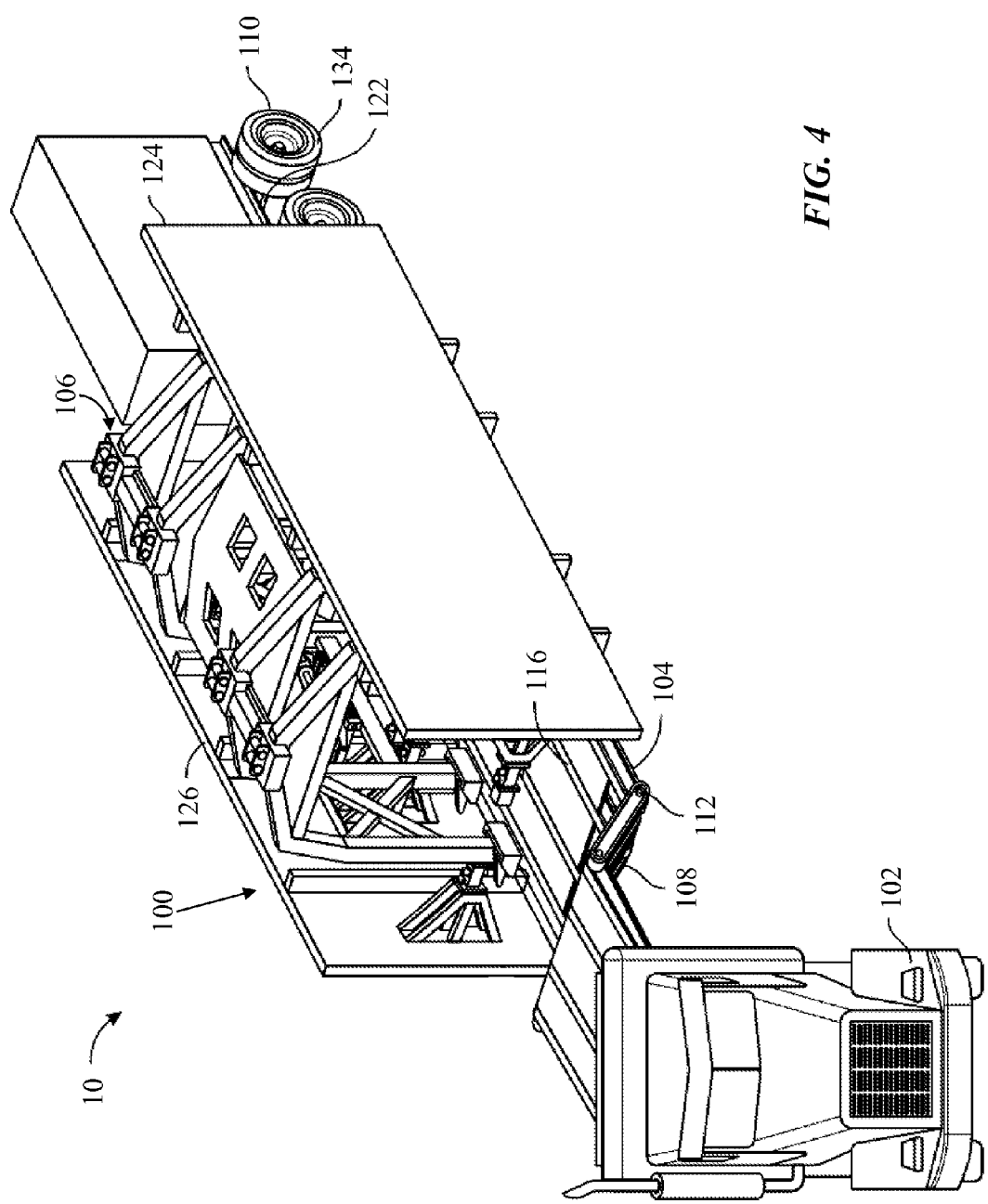
FIG. 4 is a perspective view of a portion of the apparatus shown in FIG. 1 in another stage of operation.
Figure 5:
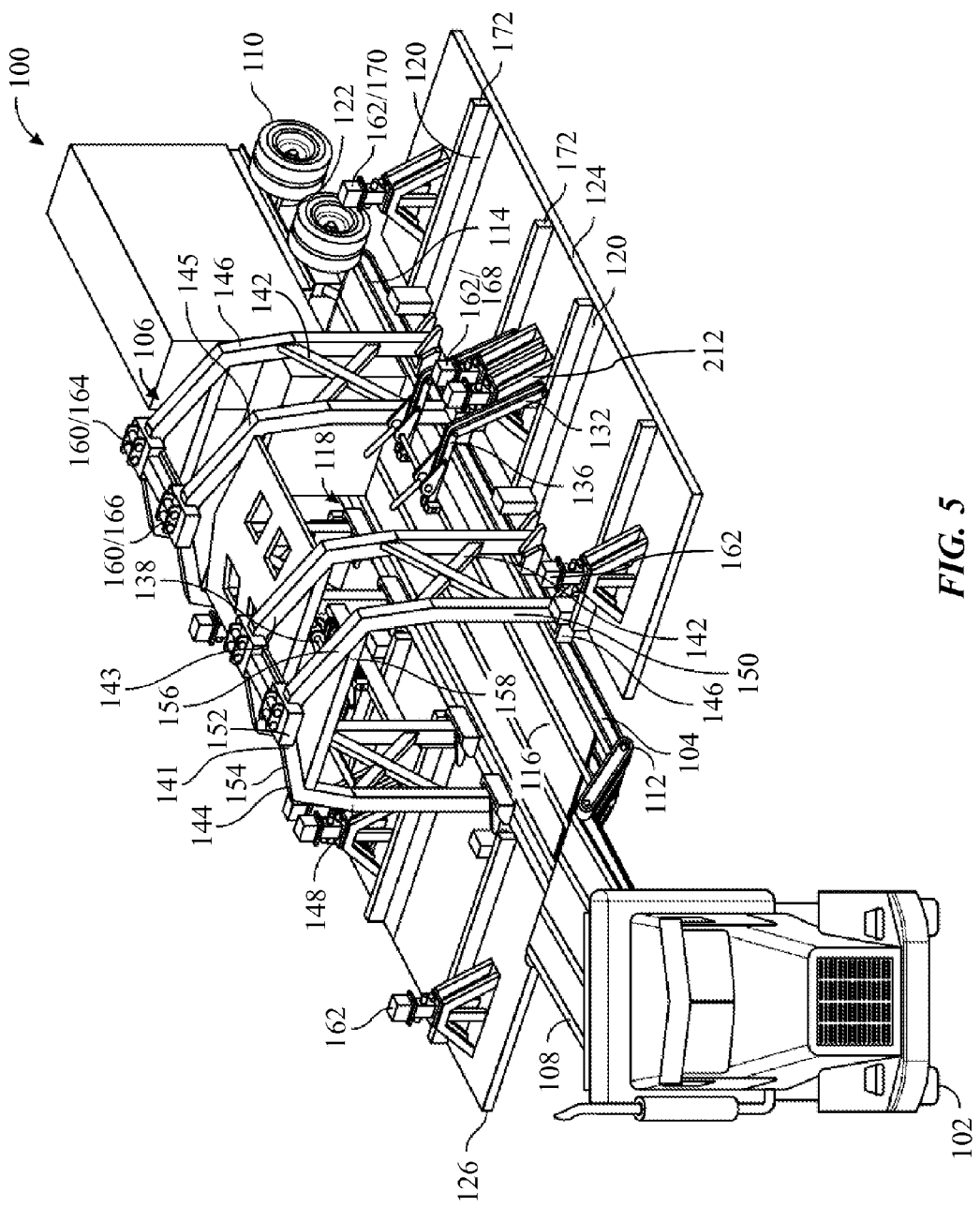
FIG. 5 is a perspective view of a portion of the apparatus shown in FIG. 4 in another stage of operation.
Figure 6:
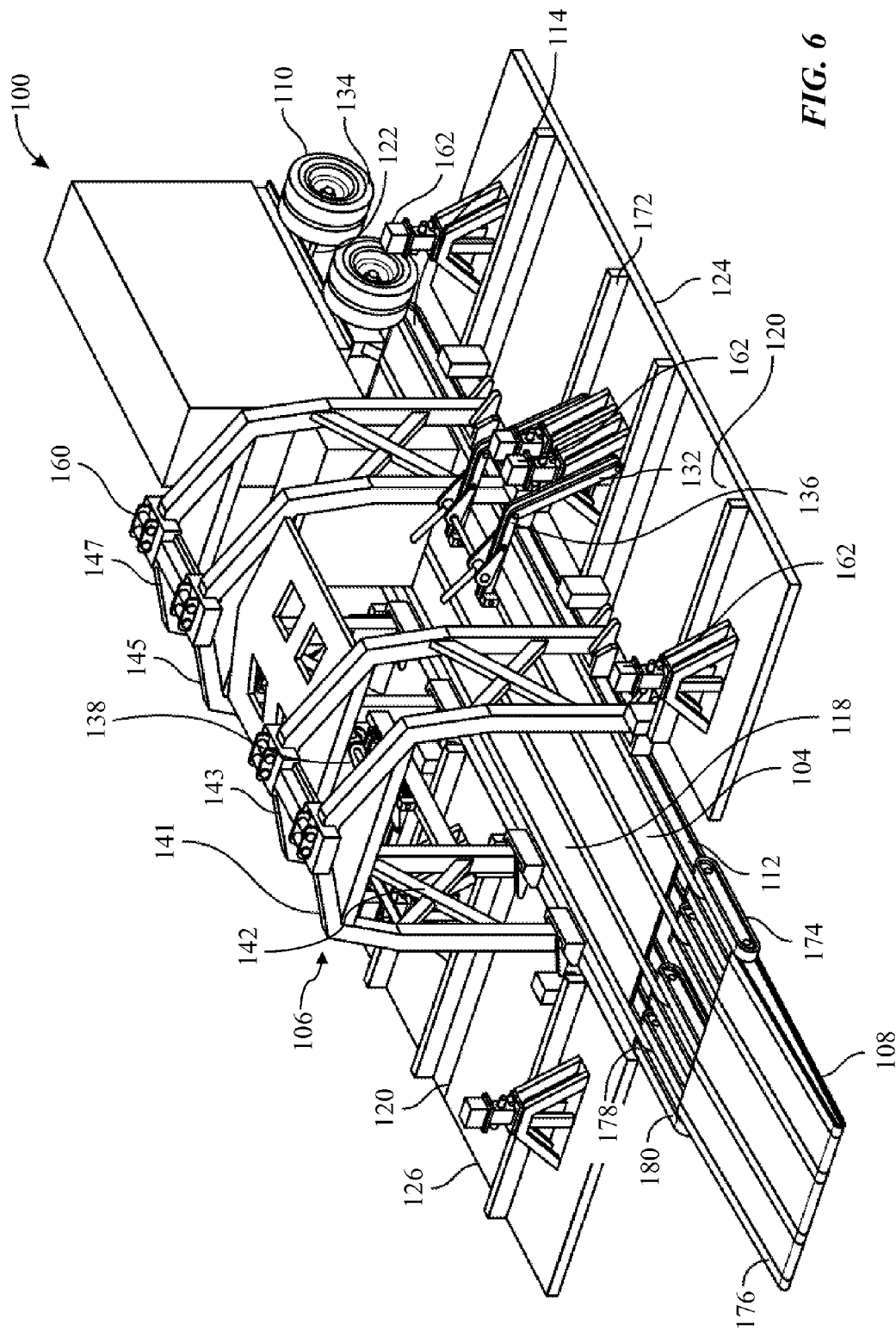
FIG. 6 is a perspective view of a portion of the apparatus shown in FIG. 5.

FIG. 4 is a perspective view of at least a portion of the MSS 100 in a transport orientation. FIG. 5 is a perspective view of the MSS 100 being deployed at a wellsite, such as the wellsite 12 shown in FIG. 1, and FIG. 6 is a perspective view of the MSS 100 in an operational orientation after such deployment. The following description refers to FIGS. 1 and 4-6, collectively.

The MSS 100 may comply with various state, federal, and international regulations for transport over roadways and highways. In this regard, the MSS 100 may have a width equal to or less than about 12 feet (or about 3.7 meters), a height equal to or less than about 13.5 feet (or about 4.1 meters), and a length equal to or less than about 53 feet (or about 16.2 meters).

The MSS 100 may include a support base 104, a frame structure 106, a gooseneck portion 108, and a plurality of wheels 110 for supporting the support base 104, a frame structure 106, and a gooseneck portion 108. The gooseneck portion 108 may be attached to the truck 102 such that the truck 102 may move the MSS 100 between various locations, such as between the wellsite 12 and another wellsite. The MSS 100 may thus be transported to the wellsite 12 and then set up to support one or more modular silos 18. Although the depicted example of the MSS 100 may support up to four modular silos 18, it should be understood that the MSS 100 may be configured to support more or less of the modular silos 18. Furthermore, the MSS 100 may be configured in accordance with state and federal regulations, which may control or otherwise limit the size of the MSS 100 as well as the width and/or size of the modular silos 18.

The support base 104 may include a first end 112, a second end 114, and a top surface 116. The frame structure 106 may extend above the support base 104 to define a passage 118 generally located between the top surface 116 of the support base 104 and the frame structure 106. The frame structure 106 includes one or more silo-receiving regions 120 each configured to receive a modular silo 18. For example, the frame structure 106 is shown defining four silo-receiving regions 120, each configured to support a corresponding one of the modular silos 18.

The gooseneck portion 108 may extend from the first end 112 of the support base 104. Axles 122 supporting wheels 110 may be located proximate the second end 114 of the support base 104, proximate the first end 112 of the support base 104, and/or at other locations relative to the support base 104. Although FIGS. 5 and 6 show the MSS 100 comprising two sets of wheels 110 and axles 122 (second axle obstructed from view), it should be understood that more than two sets of wheels 110 and axles 122, positioned at various locations relative to the support base 104, may be utilized.

The MSS 100 may further comprise a first extendable base 124 on one side of the support base 104, and a second extendable base 126 on the opposing side of the support base 104. In such implementations, the first and second extendable bases 124, 126 may aid in laterally supporting or stabilizing the frame structure 106, and thus the modular silos 18, such as may aid in preventing the modular silos 18 and the frame structure 106 from falling over. The first and second extendable bases 124, 126 may also serve as a loading base for a truck during mounting of the modular silos 18 onto the MSS 100, as explained below.

The first and second extendable bases 124, 126 may be movably connected to at least one of the frame structure 106 and the support base 104 via one or more mechanical linkages 132, such that the first and second extendable bases 124, 126 may be selectively positioned between the transportation configuration, as shown in FIG. 4, and the operational configuration, as shown in FIG. 6. In the transportation configuration, the first and second extendable bases 124, 126 may extend substantially vertically and adjacent to at least a portion of the frame structure 106, such as to be within acceptable size limits for transporting the MSS 100 on public roads and highways. However, in the operational configuration, the first and second extendable bases 124, 126 may extend substantially horizontally from the frame structure 106, such as may aid in laterally supporting the modular silos 18 and/or to provide a loading base for the trucks mounting the modular silos 18 onto the MSS 100.

The linkages 132 may permit the support base 104 to move between the transportation configuration, in which the support base 104 is located above a lower portion (e.g., a lower half) 134 of the wheels 110, and the operational configuration, in which the support base 104 may be positioned on the ground and at least a portion of the support base 104 may be substantially aligned with the lower portion 134 of the wheels 110. When at least a portion of the support base 104 is positioned on the ground and the first and second extendable bases 124, 126 are positioned in the operational configuration, the support base 104 and the first and second extendable bases 124, 126 may be substantially coplanar. The support base 104 and the first and second extendable bases 124, 126 may also be positioned on a pad (not shown), such as may aid in stabilizing the support base 104 and the extendable bases 124, 126 on the ground at the wellsite 12 prior to erecting the modular silos 18 onto the MSS 100.

The one or more mechanical linkages 132 movably connecting the frame structure 106 and/or the support base 104 with the first and second extendable bases 124, 126 may include a first set of hinges connecting the first extendable base 124 to the frame structure 106 and/or the support base 104, and a second set of hinges connecting the second extendable base 126 to the frame structure 106 and/or the support base 104. To automate the movement of the first and second extendable bases 124, 126 between the operational configuration and the transportation configuration, the one or more mechanical linkages 132 may include a first set of actuators 136 and a second set of actuators 138. The first set of actuators 136 may be connected to the frame structure 106 and/or the support base 104 and the first extendable base 124. The second set of actuators 138 may be connected to the frame structure 106 and/or the support base 104 and the second extendable base 126. The first and second sets of actuators 136, 138 may be operable to selectively move the first and second extendable bases 124, 126, respectively, between the operational configuration and the transportation configuration. Each set of actuators 136, 138 may be constructed in a variety of manners, such as may comprise a hydraulic cylinder, a pneumatic cylinder, a solenoid, and/or a manual activation mechanism, among other options within the scope of the present disclosure. The first and second sets of actuators 136, 138 may each comprise two actuators, as shown in FIG. 6, although other numbers of actuators may also be provided depending, for example, on the size of the actuators and/or the size of the first and second extendable bases 124, 126.

The frame structure 106 may comprise a plurality of frames 141, 143, 145, 147 interconnected by a plurality of struts 142. The frames 141, 143, 145, 147 may be substantially parallel to each other and may be substantially similar in construction and function. Each frame 141, 143, 145, 147 may comprise a top member 144, a bottom member 146, and two side members 148, 150 (e.g. as shown in FIG. 5), such as may be connected to form a closed structure surrounding at least a portion of the passage 118. Two or more of the members 144, 146, 148, 150 within each frame 141, 143, 145, 147 may be integrally formed. The side members 148, 150 and the top member 144 may form an arch, such as may increase the structural strength of each frame 141, 143, 145, 147. The top member 144 may include an apex 152 that may be centrally located between the side members 148, 150. The top member 144 may include a first leg 154 and a second leg 156, which may be connected together at the apex 152. The first leg 154 may be connected to the side member 148, and the second leg 156 may be connected to the side member 150. The top member 144 may also comprise or be connected to a support beam 158. The support beam 158 may reinforce the first leg 154 and the second leg 156, such as may aid in preventing relative deflection of the first and second legs 154, 156 when the modular silos 18 are being supported. Each frame 141, 143, 145, 147 may be formed from suitable materials operable to support the load from the modular silos 18. For example, the frames 141, 143, 145, 147 may be constructed from steel tubulars, I-beams, channels, and/or other suitable material, and may be connected together via various mechanical fastening techniques, such as may utilize one or more threaded fasteners, plates, welds, and/or other connection means.

One set of struts 142 may connect the frames 141, 143 in a manner permitting jointly supporting two modular silos 18 in the corresponding silo-receiving regions 120. Likewise, another set of struts 142 may connect the frames 145, 147 in a manner permitting jointly supporting two additional modular silos 18 in the corresponding silo-receiving regions 120. A first set of connectors 160 may be disposed at the apex 152 of each frame 141, 143, 145, 147 within corresponding silo-receiving regions 120, wherein each of the first set of connectors 160 may couple or engage with a corresponding connector on the modular silo 18 or a corresponding portion of the modular silo 18 during and after modular silo 18 installation. A second set of connectors 162 may be disposed within the corresponding silo-receiving regions 120 on the first expandable base 124 and/or the second expendable base 126 at a lower elevation than the first set of connectors 160. Each of the second set of connectors 162 may couple or engage with a corresponding connector on the modular silo 18 or a corresponding portion of the modular silo 18 during and after modular silo 18 installation.

Referring also to FIG. 5, the first set of connectors 160 within each of the silo-receiving regions 120 may comprise a first and second connectors 164, 166, which may be configured to attach to or otherwise engage the silo frame 56 of the modular silos 18. The second set of connectors 162 within each of the silo-receiving regions 120 may include a first connector 168 and a second connector 170, which may be configured to attach to or engage the silo frame 56 of the modular silos 18. The first and second connectors 168, 170 may be configured to connect to the silo frame 56 of the modular silo 18 when the modular silo 18 is in the transportation configuration disposed on a chassis 190 (e.g., see FIG. 7), as described below. The chassis 190 may be moved (e.g., backed) to substantially align the silo frame 56 with the first set of connectors 160 and the second set of connectors 162. To aid in moving the chassis 190 to substantially align the silo frame 56 with the first connector 160 and the second connector 162, alignment guides 172 may be disposed on the first expandable base 124 and the second expandable base 126 within each of the silo-receiving regions 120 (e.g. as shown in FIG. 5). When the silo frame 56 of a modular silo 18 to be erected onto the MSS 100 is coupled with the second set of connectors 162, the modular silo 18 may be moved from the transportation configuration to the operational configuration along an arc-shaped path, as described below. Furthermore, when the modular silo 18 is in the operational configuration, the silo frame 56 may be coupled with the first set of connectors 160 of the MSS 100 to maintain the modular silo 18 securely on the MSS 100.

Once the support base 104 and the first and second expandable bases 124, 126 have been deployed to the operational configuration, the truck 102 may be disconnected from the gooseneck portion 108 of the MSS 100. Thereafter, the gooseneck portion 108 may be manipulated to lie on the ground, perhaps substantially co-planar with the support base 104, such as to form a ramp to aid an operator in positioning the blending system 32 within the passage 118, as shown in FIG. 2.

The gooseneck portion 108 may include a first section 174 and a second section 176. (e.g. as shown in FIG. 6) The first section 174 may have a first end 178 and a second end 180 and may extend from the first end 112 of the support base 104 to the second section 176 of the gooseneck portion 108. The first end 178 of the first section 174 may be movably connected to the support base 104 via one or more hinges, voids and pins, clevis joints, and/or other types of connectors, perhaps including those that may be locked at more than one position. The second section 176 may movably connected to the second end 180 of the first section 174. The first section 174 may be or comprise a four bar linkage, such as may be locked in an elevated position, to form the gooseneck, or in a lowered position, to form the ramp.

Figure 7:
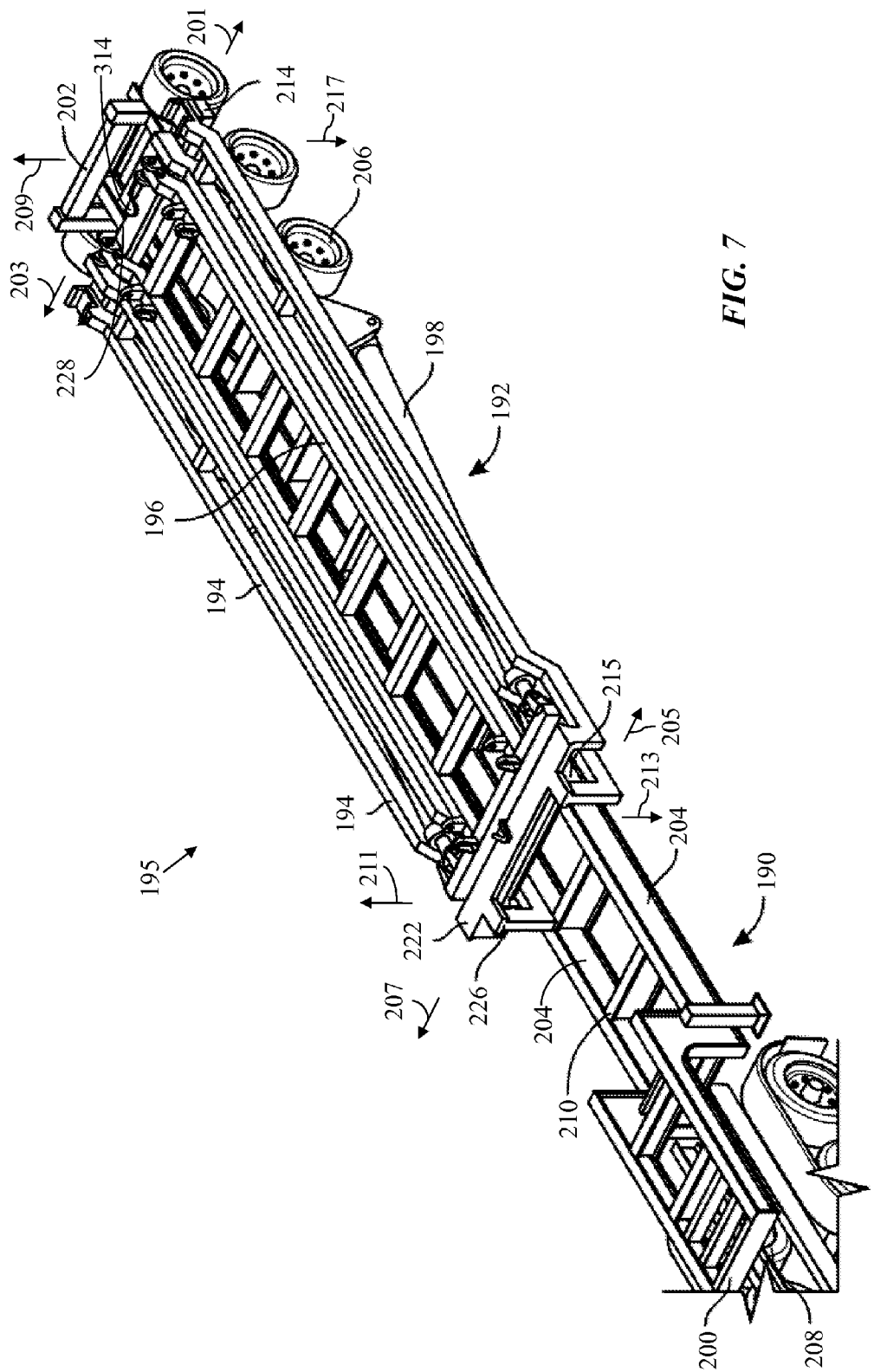
FIG. 7 is a perspective view of at least a portion of an apparatus according to one or more aspects of the disclosure.
Figure 8:
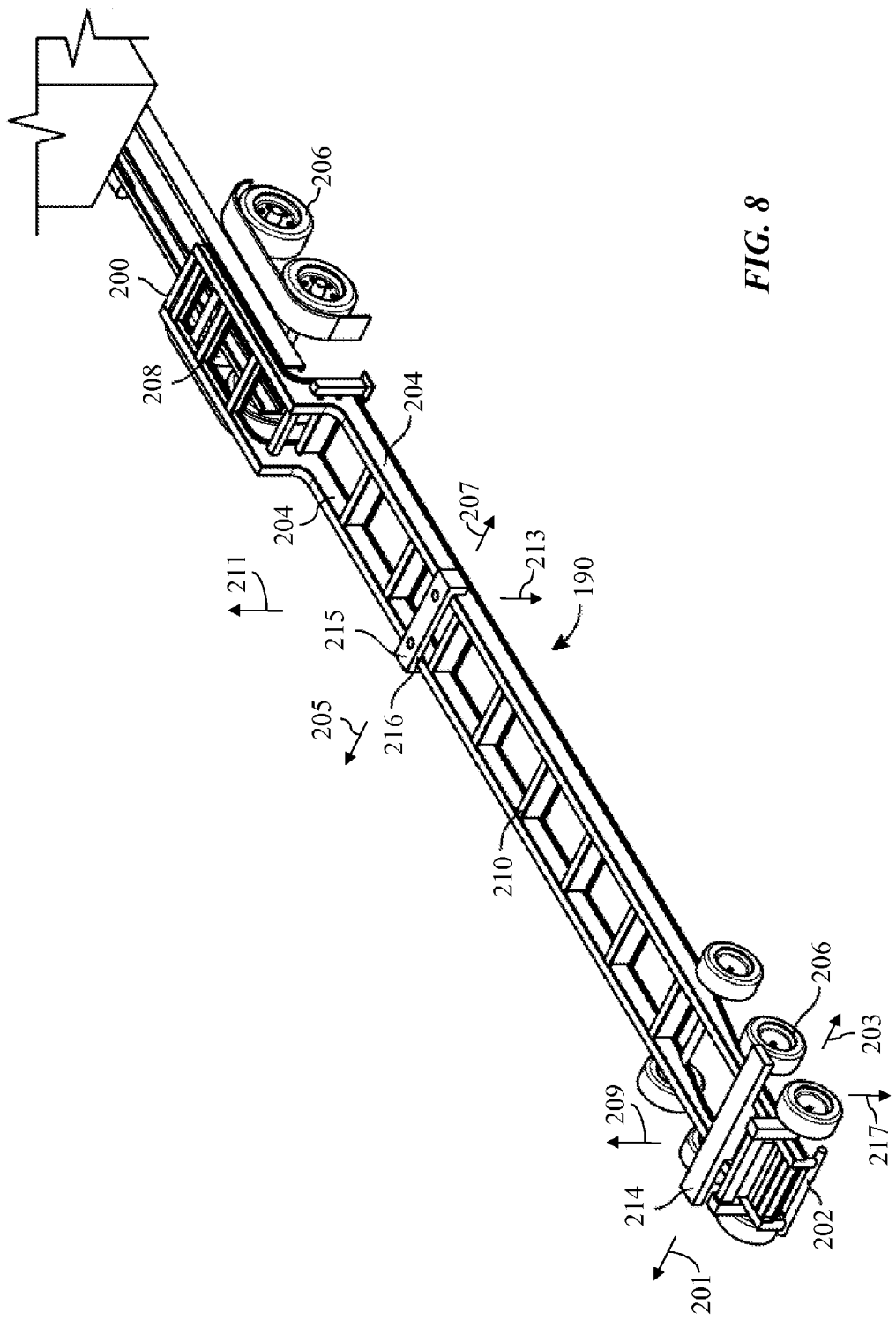
FIG. 8 is a perspective view of a portion of the apparatus shown in FIG. 7.
Figure 9:
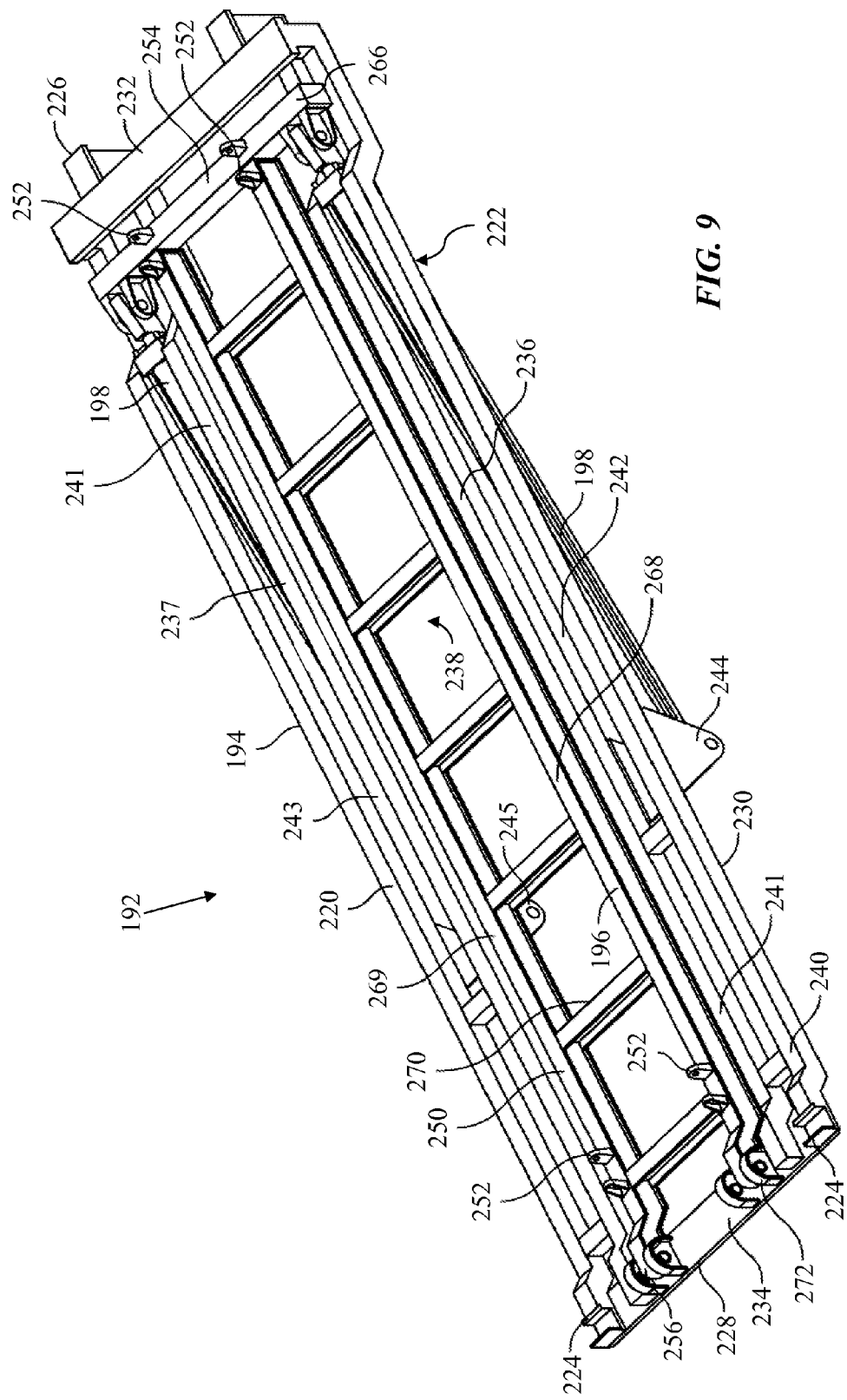
FIG. 9 is a perspective view of a portion of the apparatus shown in FIG. 7.
Figure 10:
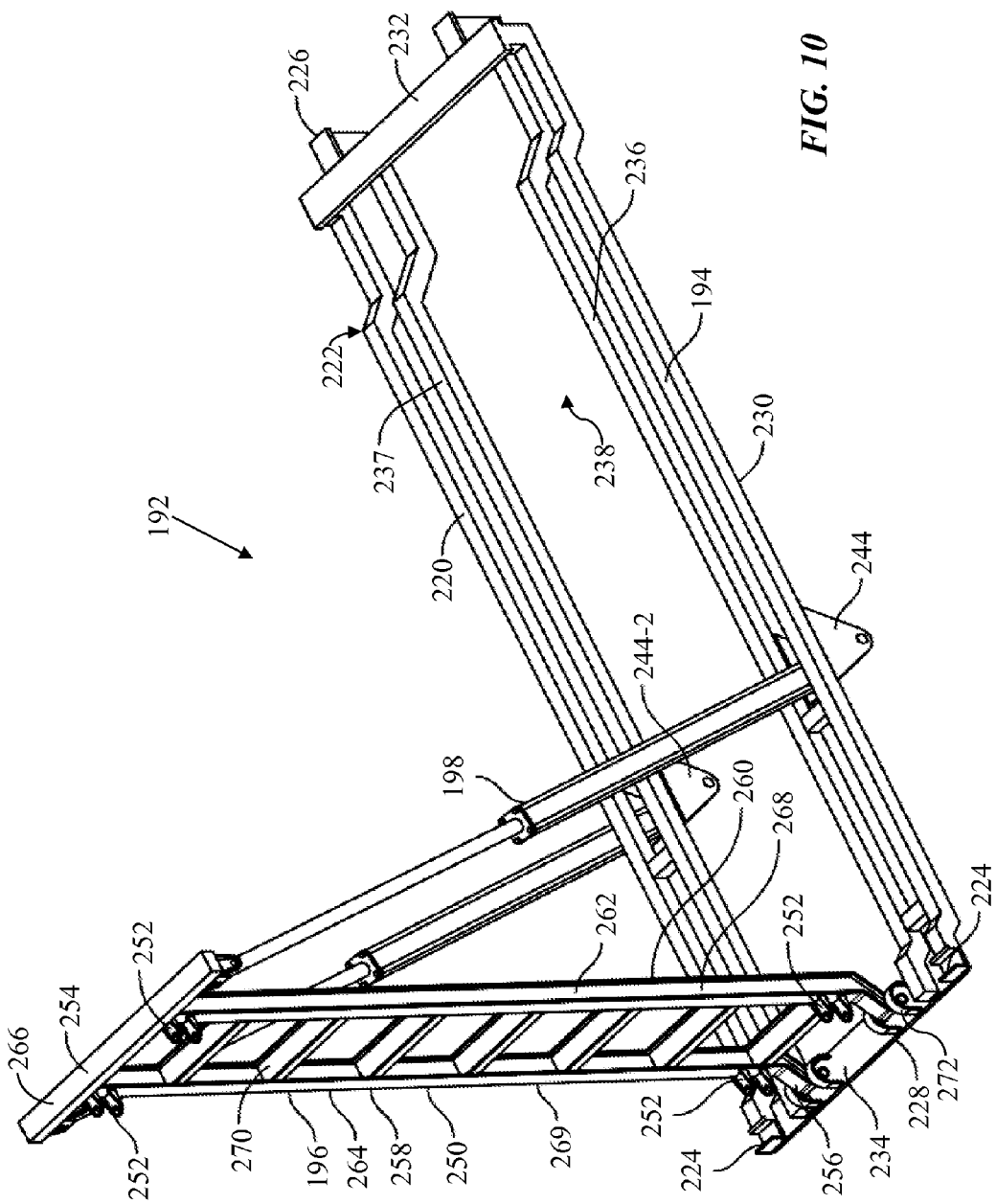
FIG. 10 is a perspective view of a portion of the apparatus shown in FIG. 9 in another stage of operation.

FIG. 7 is a perspective view of at least a portion of a silo delivery system 195 transported via the chassis 190 described above. FIG. 8 is a perspective view of a portion of the chassis 190 shown in FIG. 7. FIG. 9 is a perspective view of an erector assembly 192 shown in FIG. 7. FIG. 10 is a perspective view of a portion of the erector assembly 192 shown in FIG. 9 in another stage of operation. Referring to FIGS. 7-10, collectively, the chassis 190 may be configured to support the modular silo 18 and be pulled by a truck, such as truck 28 (e.g., see FIG. 21), to transport the modular silo 18 to the wellsite 12 while in the transportation configuration. The silo delivery system 195 may be operable to erect the modular silo 18 to the upright operational position and to install the modular silo 18 on the MSS 100. For example, the chassis 190 may be coupled with the erector assembly 192, which may be operable to move the modular silo 18 from the transportation configuration and to install the modular silo 18 on the MSS 100 in the operational configuration (e.g., see FIGS. 21-23). The silo delivery system 195 may comprise the chassis 190, a cradle structure 194 (which may be referred to herein as a base) supported by the chassis 190, an erecting mast 196 connected to at least one of the cradle structure 194 and a portion of the chassis 190, and an actuator assembly 198 engaging the erecting mast 196.

The chassis 190 may include a first end 200 (i.e., a front end) and a second end 202 (i.e., a rear end or "rear"), support beams 204 extending between the first end 200 and the second end 202, and wheels 206 disposed at least partially underneath and operably connected to the support beams 204. The support beams 204 may be elongated beams extending longitudinally with respect to the chassis 190, and may be connected together to collectively form a horizontal structural support. Although the chassis 190 is shown comprising two support beams 204, the chassis 190 may comprise another number of support beams 204. Each support beam 204 may be implemented as a steel beam, channel, I-beam, H-beam, wide flange, universal beam, rolled steel joist, or other structure providing structural integrity to the chassis 190.

The wheels 206 may be disposed at least partially underneath a horizontal plane intersecting and parallel to the support beams 204. The chassis 190 may comprise or form at least a portion of a trailer, and may thus comprise a trailer hitch 208 located adjacent the first end 200 of the chassis 190. The trailer hitch 208 may be implemented as a gooseneck hitch having a structure known in the art as a "kingpin."

The chassis 190 may further comprise one or more lateral support members 210 extending between and connecting two or more support beams 204. The support members 210 may be spaced a predetermined distance apart from an adjacent support member 210, between the first and second ends 200, 202 of the chassis 190.

Referring also to FIG. 5, to facilitate horizontal and/or vertical alignment with a portion of the MSS 100, such as the first and second connectors 168, 170 supported by the struts 212, the mobile erector assembly 192 may comprise first and second silo support and alignment assemblies 214, 215. The first silo support and alignment assembly 214 may be positioned proximate the second end 202 of the chassis 190, and the second silo support and alignment assembly 215 may be positioned between the first silo support and alignment assembly 214 and the first end 200 of the chassis 190. The first and second silo support and alignment assemblies 214, 215 (e.g. as shown in FIG. 8) may be connected to and supported by the support beams 204. For example, the first and second silo support and alignment assemblies 214, 215 may be positioned between the support beams 204 and the cradle structure 194, and may pivotably and/or otherwise movably couple the cradle structure 194 with the support beams 204. The first and second silo support and alignment assemblies 214, 215 may each be independently operable to pivotably couple the chassis 190 with the mobile erector assembly 192.

Referring now to FIGS. 2, 7, 9, and 10, collectively, the cradle structure 194, which may be referred to herein as the base, may be coupled with and/or supported by the support beams 204 of the chassis 190. For example, the cradle structure 194 may include a top surface 220, such as may be operable for supporting at least one modular silo 18 in the transport configuration. In the transport configuration, the modular silo 18 is disposed in a substantially horizontal orientation, such as may be operable for over-the-road transportation, and the modular silo 18 may be substantially aligned with at least a portion of the support beams 204. In another example implementation, the transportation configuration may comprise the modular silo 18 oriented such that at least a portion of the modular silo 18 is at an incline in relation to the ground level and/or the support beams 204.

The cradle structure 194 may comprise a frame 222 and a plurality of support members 224. The frame 222 may include a first end 226, a second end 228, the top surface 220, and a bottom surface 230. The frame 222 may further comprise a first end member 232 proximate the first end 226, a second end member 234 proximate the second end 228, a first support beam 236 extending between the first and second end members 232, 234, and a second support beam 237 extending between the first and second end members 232, 234. The first and second support beams 236, 237 may be spaced apart and configured to define an erecting mast void 238, which may receive therein at least a portion of the erecting mast 196. Each of the first and second support beams 236, 237 may comprise a first support member 240 and a second support member 241, which may be disposed in parallel and spaced apart to receive therebetween at least a portion of the actuator assembly 198. The first and second support members 240, 241 may at least partially surround and/or define a first actuation void 242, which may receive therein a first actuator of the actuator assembly 198. The first and second support members 240, 241 of the second support beam 237 may at least partially surround and define a second actuation void 243, which may receive a second actuator of the actuator assembly 198. Although the cradle structure 194 is shown with an erecting mast void 238 and first and second actuation voids 242, 243, it should be understood that the cradle structure 194 may be implemented with a single void to receive both actuators of the actuator assembly 198 and the erecting mast 196.

The cradle structure 194 may permit the erecting mast 196 to pivot or otherwise move to an upright mounting position via operation of the actuator assembly 198, such as when erecting the modular silo 18 onto the MSS 100. The first and second end members 232, 234, the first and second support beams 236, 237, and the first and second support members 240, 241 may comprise steel tubing, beam, channel, I-beam, H-beam, wide flange, universal beam, rolled steel joist, or other material operable to maintain its structural integrity during operations.

The support members 224 may be roller support members 224 fixedly connected with the cradle structure 194, proximate the second end 228 of the cradle structure 194. The roller support members 224 may support the modular silo 18 during transportation in the transportation configuration. The support members 224 may be disposed on the top surface 220 of the cradle structure 194 such that the plurality of support members 224 may support the modular silo 18 while disposed on the top surface 220 of the cradle structure 194. The cradle structure 194 may also comprise tabs 244, 245 extending from the bottom surface 230 of the cradle structure 194, wherein the tabs 244, 245 may connect the actuator assembly 198 to the cradle structure 194, such as via a pivot connection.

The erecting mast 196 may be pivotably coupled to at least one of the cradle structure 194 and the support beams 204 of the chassis 190 to permit an arc-shaped movement of the erecting mast 196 relative to the cradle structure 194 and the support beams 204. The erecting mast 196 may comprise a lifting structure 250, which may be operable to move vertically beyond the top surface 220 of the cradle structure 194 along an arc-shaped path from a lateral position, shown in FIG. 9, to a vertical position, shown in FIG. 10. The lifting structure 250 of the erecting mast 196 may support the modular silo 18 and lift the modular silo 18 during erection of the modular silo 18 onto the MSS 100. The erecting mast 196 may further comprise a plurality of connection members 252 disposed on or connected with the lifting structure 250, wherein the connection members 252 may couple and/or stabilize the modular silo 18 on the lifting structure 250.

The lifting structure 250 may include a first end 254, a second end 256, a top 258, a bottom 260, a first side 262, and a second side 264. In addition, the lifting structure 250 may comprise a first end member 266 proximate the first end 254, a first support beam 268 extending between the first end 254 and the second end 256, a second support beam 269 extending between the first end 254 and the second end 256, and a plurality of lateral support members 270 extending between the first and second support beams 268, 269 and spaced a distance apart between the first end 254 and the second end 256. However, it should be understood that the lifting structure 250 may comprise other configurations, such as may support at least a portion of the modular silo 18 when moving from the transportation configuration to the operational configuration. The first end member 266 may be operable to engage the actuator assembly 198 and connect the erecting mast 196 to the actuator assembly 198. The first and second support beams 268, 269 may be configured to connect to at least one of the cradle structure 194 and support beams 204 of the chassis 190 at the second end 256 of the lifting structure 250.

The first and second support beams 268, 269 may be connected with the second end member 234 of the cradle structure 194 by a pivot connection 272. In another example implementation, the pivot connection 272 and the support members 224 may be or comprise the same component. As the lifting structure 250 may be connected with the actuator assembly 198 proximate the first end 254 of the lifting structure 250 and at least one of the cradle structure 194 and the chassis 190 proximate the second end 256 of the lifting structure 250, the lifting structure 250 may be moved between the transportation configuration and the operational configuration along an arc-shaped path. The lifting structure 250 of the erecting mast 196 may comprise steel tubing, beam, channel, I-beam, H-beam, wide flange, universal beam, rolled steel joist, or other material operable to supporting at least a portion of the modular silo 18 when moving between the transportation configuration (i.e., lateral or horizontal position) and the operational configuration (i.e., upright or vertical position).

The plurality of connection members 252 may be operable to releasably connect the erecting mast 196 with the silo frame 56 or other portions of the modular silo 18. The connection members 252 may be disposed on the top 258 of the lifting structure 250 and may be connected to the lifting structure 250 by welding, threaded fasteners, and/or other suitable connection means. Furthermore, the connection members 252 may be or comprise clamps, voids and pins, bolts and mounting plates, and/or other releasable connection mechanisms.

The actuator assembly 198 may engage the lifting structure 250 of the erecting mast 196 and at least one of the support beams 204 of the chassis 190 and the cradle structure 194 to move the lifting structure 250 along an arc-shaped path for erecting the modular silo 18. Accordingly, the actuator assembly 198 may be operable to move the lift structure 250 from the transportation configuration to the operational configuration. As shown in FIGS. 9 and 10, the actuator assembly 198 may comprise a plurality of actuators working in concert to pivot or otherwise move the lifting structure 250 from the horizontal position to the vertical position. However, it should be understood that the actuator assembly 198 may be implemented as a single actuator or another number of actuators. The actuator assembly 198 may also be implemented as hydraulic actuators, pneumatic actuators, electrical actuators, mechanical actuators, or other suitable mechanisms operable for moving the lifting structure 250 toward the vertical position.

Figure 11:
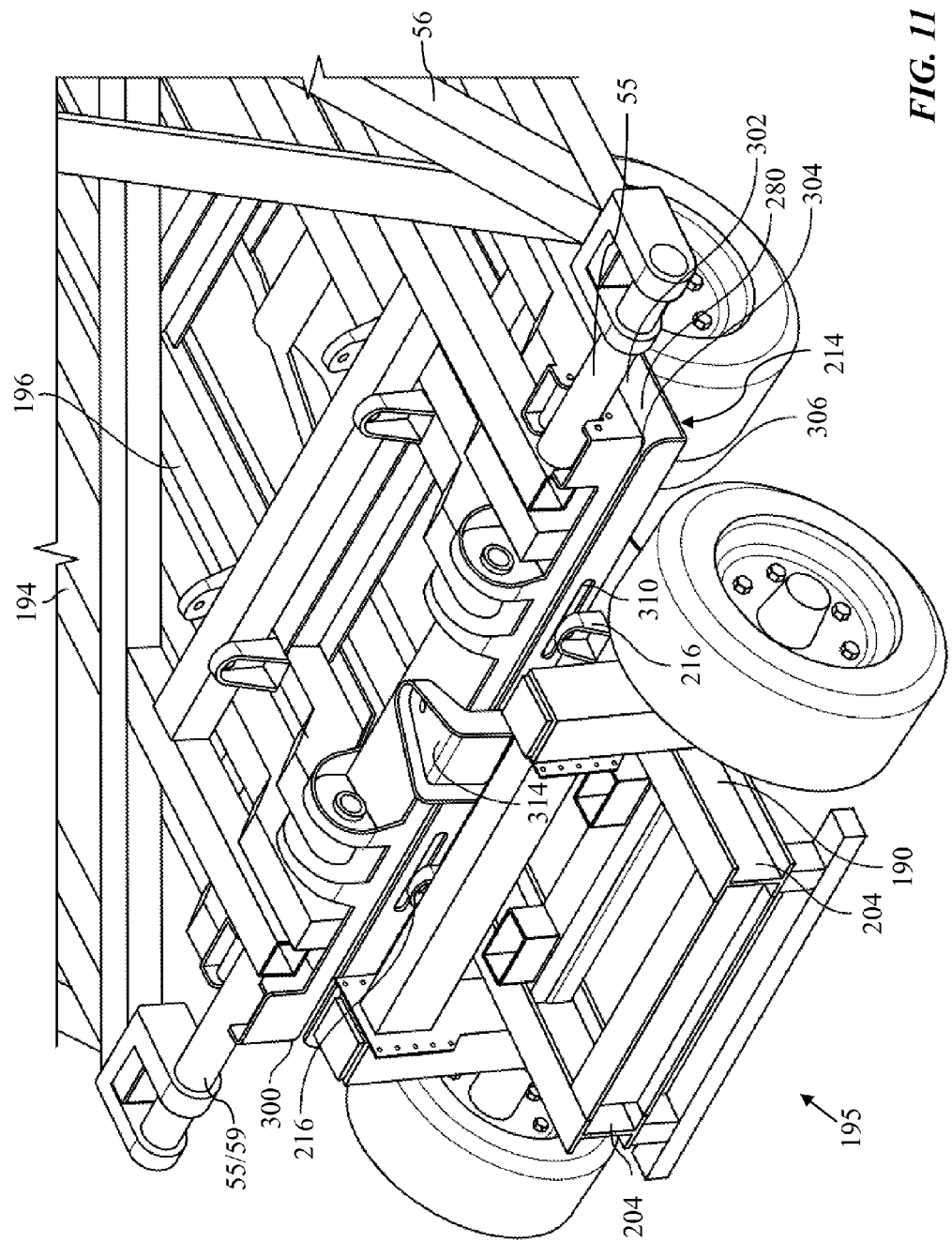
FIG. 11 is a perspective view of a portion of the apparatus shown in FIG. 7.
Figure 12:
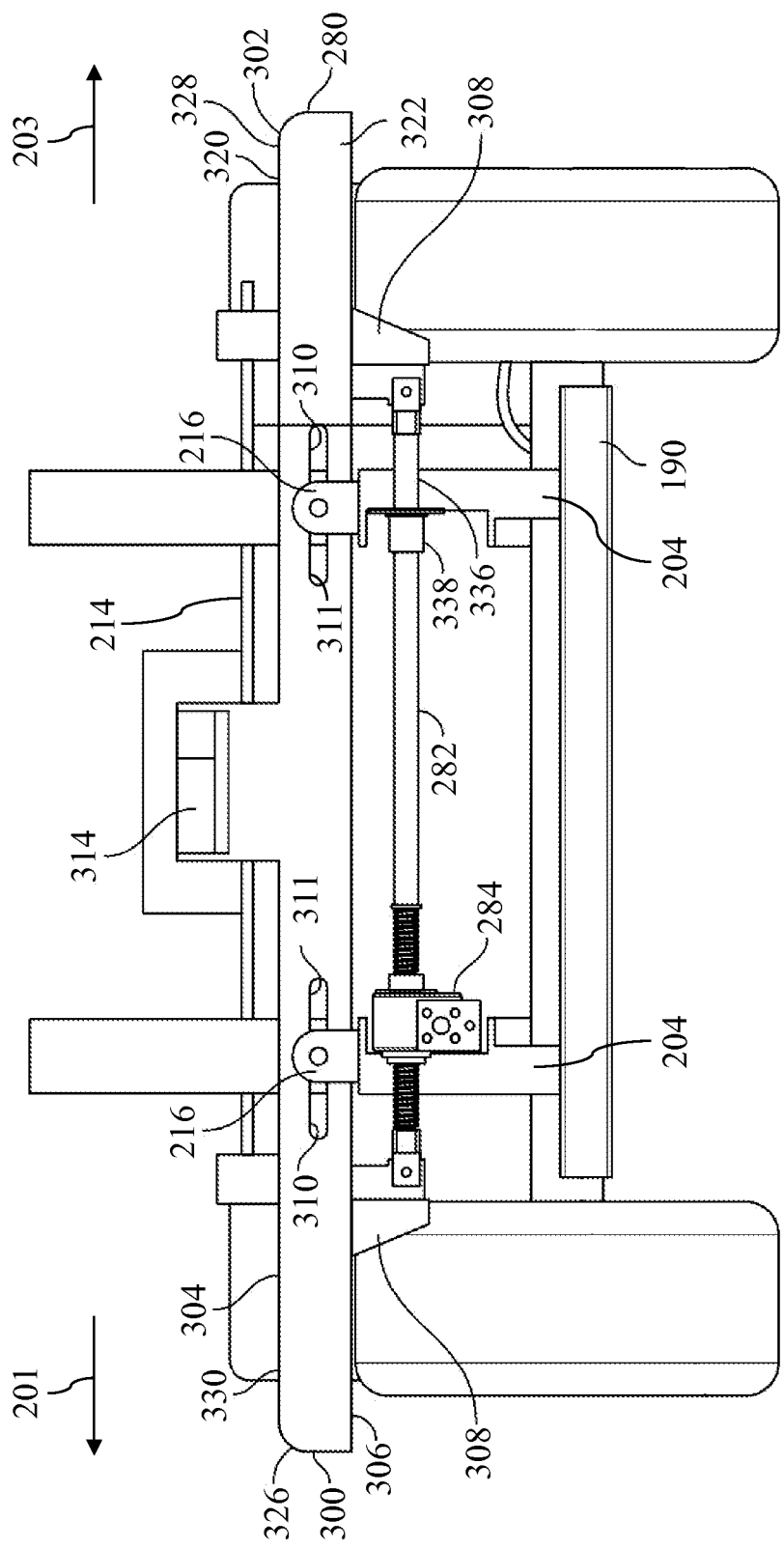
FIG. 12 is an elevation view of a portion of the apparatus shown in FIG. 11.
Figure 13:
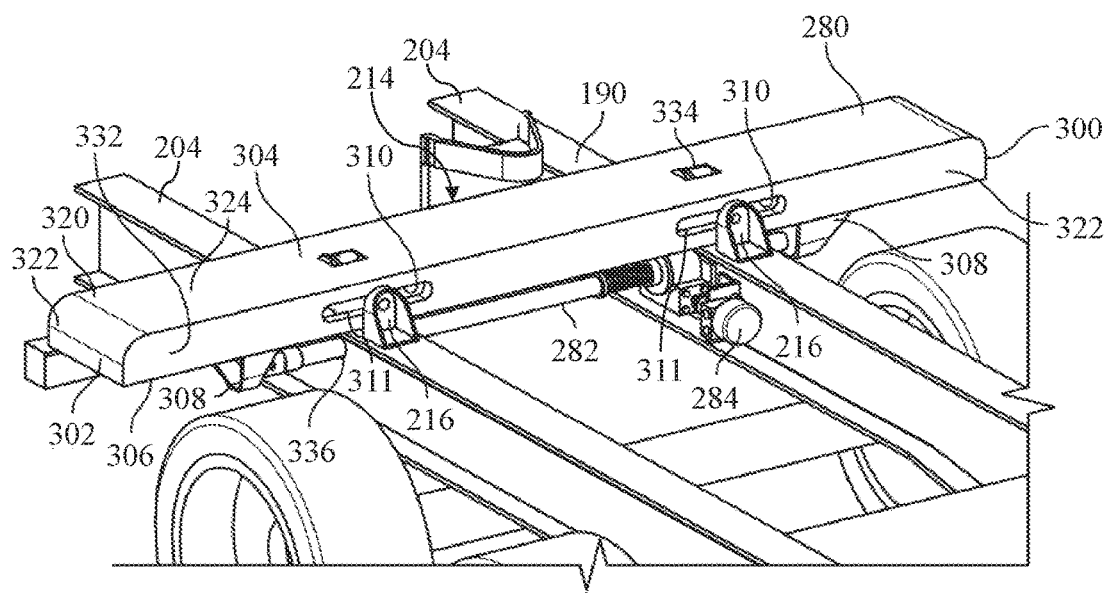
FIG. 13 is a perspective view of a portion of the apparatus shown in FIG. 11.
Figure 14:
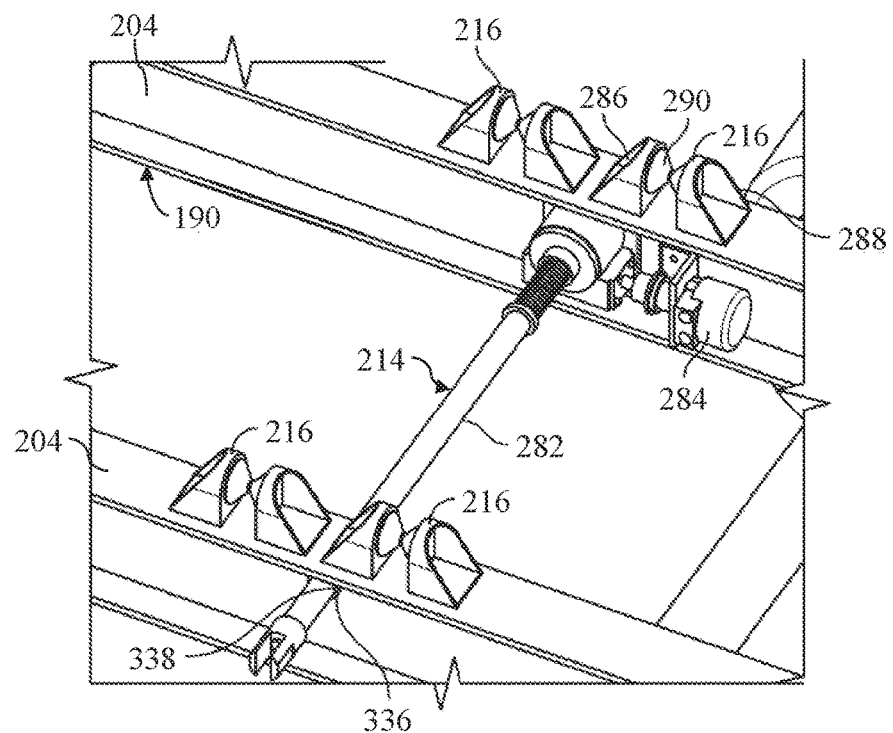
FIG. 14 is a perspective view of a portion of the apparatus shown in FIG. 13.

FIG. 11 is a perspective view of a portion of the silo delivery system 195 shown in FIG. 7, according to one or more aspects of the disclosure. FIG. 12 is an elevation view of a portion of the chassis 190 shown in FIG. 11. FIG. 13 is a perspective view of a portion of the chassis 190 shown in FIG. 11. FIG. 14 is a perspective view of a portion of the chassis 190 shown in FIG. 13. Referring to FIGS. 7-14, collectively, each of the silo support and alignment assemblies 214, 215 may comprise one or more actuators 284 operable to move the mobile erector assembly 192 in a lateral direction with respect to a longitudinal axis of the chassis 190. The first silo support and alignment assembly 214 may laterally move a first (rear) end of the erector assembly 192, and thus a first (lower) end of the modular silo 18, in the lateral or horizontal direction with respect to the chassis 190, as indicated by arrows 201, 203. The second silo support and alignment assembly 215 may laterally move at least a second (forward) end of the erector assembly 192, and thus a second (upper) end of the modular silo 18, in the lateral or horizontal direction with respect to the chassis 190, as indicated by arrows 205, 207 (e.g. as shown in FIG. 8). The silo support and alignment assemblies 214, 215 may laterally move or translate the erector assembly 192, and thus the modular silo 18, in the same lateral or horizontal direction with respect to the chassis 190, such as in the direction indicated by arrows 201 and 205 or in the direction indicated by arrows 203 and 207. However, the silo support and alignment assemblies 214, 215 may also laterally move or translate the erector assembly 192, and thus the modular silo 18, in opposing lateral or horizontal directions, such as in the directions indicated by arrows 201 and 207 or in the directions indicated by arrows 203 and 205.

The silo support and alignment assemblies 214, 215 may comprise the same or similar function and/or configuration. Therefore, for clarity purposes, while the first silo support and alignment assembly 214 is described below, such description is also applicable to the second silo support and alignment assembly 215.

The silo support and alignment assembly 214 may comprise a support member 280 extending transversely with respect to the support beams 204 of the chassis 190, an actuation member 282 coupled with the support beams 204 and the support member 280, and a motive element 284 operatively connected to the actuation member 282. The support member 280 may be movable relative to the support beams 204. The support member 280 may be movably coupled with the support beams 204 by way of the plurality of support mechanisms 216, such as may permit lateral movement with respect to the support beams 204. The plurality of support mechanisms 216 may be implemented as V-profile roller assemblies, each having a first mounting bracket 286, a second mounting bracket 288, and an inwardly sloping roller 290 extending between and supported by the first and second mounting brackets 286, 288. (e.g. as shown in FIG. 14)

In general, the plurality of support mechanisms 216 may be configured to establish lateral movement of the cradle structure 194 and the erecting mast 196 relative to the support beams 204 of the chassis 190, as indicated by arrows 201, 203. The roller assembly 290 may be configured to direct the support member 280 to a substantially central location between the first and second mounting brackets 286, 288, and may permit the support member 280 to move laterally, in a substantially horizontal direction, with respect to the support beams 204 of the chassis 190. However, the roller assembly 290 may be constructed in other ways, such as may include ball bearings, tracks, and/or other mechanisms to facilitate horizontal movement of the support member 280 relative to the support beams 204.

The support member 280 may have a first end 300, a second end 302, a top 304, a bottom 306, a plurality of connection members 308, and a plurality of openings 310 proximate the first and second ends 300, 302. The support member 280 may extend laterally across the support beams 204 such that each of the first and second ends 300, 302 may extend outwardly on opposite sides of the support beams 204. The connection members 308 may extend from the bottom 306 of the support member 280, and may be operable to couple the support member 280 with the actuation member 282. The support member 280 may comprise a receiving member 314 disposed on the top 304 of the support member 280. The receiving member 314 may be operable to receive and/or couple with at least a portion of the cradle structure 194, such as the first and/or second end members 232, 234, as depicted in FIGS. 7 and 9. The receiving member 314 may be implemented as a pin and void joint, a clamp, and/or other suitable mechanism capable of pivotably coupling the support member 280 with the cradle structure 194.

The support member 280 may comprise steel tubing, channel, beam, or other appropriate material operable to maintain its structural integrity during operations. The support member 280 may have a substantially C-shaped cross section, and may comprise a supporting plate 320 operable for supporting the cradle structure 194. The support member 280 may further comprise a plurality of sidewalls 322 extending from the supporting plate 320, the receiving member 314 extending from the supporting plate 320, and the connection members 308 extending from at least one of the supporting plate 320 and the plurality of sidewalls 322. The supporting plate 320 may have a top 324, a bottom (not shown), a first end 326, a second end 328, a first side 330, and a second side 332 (e.g. as shown in FIGS. 12 and 13, respectively). Each of the plurality of sidewalls 322 may extend from one of the first end 326, the second end 328, the first side 330, and the second side 332, and each of the four sidewalls 322 may connect together to form a box-like structure. The sidewalls 322 may extend downward past the bottom (not shown) of the supporting plate 320. However, it should be understood that the support member 280, the supporting plate 320, and the sidewalls 322 may be implemented differently than described above without departing from the present disclosure. The supporting plate 320 may comprise a plurality of holes 334, such as may receive therein one or more surfaces and/or connectors of the cradle structure 194 or the erecting mast 196.

The connection members 308 may extend downward from at least one of the supporting plate 320 and the sidewalls 322, and may be connected to at least one of the supporting plate 320 and the sidewalls 322. The connection members 308 may be substantially trapezoidal or other suitable shape operable to couple the actuation member to the supporting plate 320. The connection members 308 may have a T-shaped or other suitable cross-section operable to maintain structural integrity of the connection member 308.

The openings 310 may be or comprise beveled-edge slots. The openings 310 may be operable to receive therein portions of the support mechanisms 216, such as the V-profile rollers 290. The support mechanisms 216 may support the support member 280, connect the support member 280 to the support beams 204, and/or permit the support member 280 to be laterally displaced in relation to the support beams 204. (e.g. as shown in FIG. 13) For example, the holes 310 may be defined by beveled-edges or surfaces 311, which may contact the rollers 290 or be inserted within the V-profile of the rollers 290. The openings 310 may be implemented as elongated slots, however, it should be understood that the openings 310 may be implemented with or without the beveled-edges and as elongated openings, circular openings, or openings of other suitable shapes.

The actuation member 282, which may also be referred to hereinafter as a lateral actuation member 282, may be coupled to the support member 280 and the support beams 204, and may be movable relative to at least one of the support beams 204 and the support member 280. The actuation member 282 may be directly coupled to the support beams 204 and the support member 280, or the actuation member 282 may be indirectly coupled with the support beams 204 and the support member 280 through one or more intervening elements, such as linkages, additional support members, joints, gears, and/or additional actuators, for example. Movement or rotation of the actuation member 282 may cause lateral or horizontal movement of the support member 280 relative to the support beams 204. For example, the actuation member 282 may extend through one or more openings 336 extending through the support beams 204. The openings 336 may contain bushings 338 at least partially disposed therein. The bushings 338 may be operable to insulate and/or protect the openings 336 and the support beams 204. (e.g. as shown in FIG. 14)

The actuation member 282 may also be retained in position with threaded fasteners and/or other suitable mechanisms (not shown) at one or more points of connection between the actuation member 282 and the support beams 204, such as may permit the actuation member 282 to laterally (e.g. horizontally) displace the support member 280 relative to the support beams 204, as indicated by arrows 201, 203. The actuation member 282 may be implemented as a screw jack, a partially threaded screw jack, a hydraulic actuation member, a pneumatic actuation member, an electrical actuation member, a mechanical actuation member, and/or other suitable actuation members operable to move the support member 280.

The motive element 284 may be connected to and/or supported by the support beams 204, and may be operable to drive the actuation member 282 to laterally displace the support member 280 relative to the support beams 204. The motive element 284 may be implemented as a motor, an electrical motor, an engine, an actuator, a manual device, and/or other suitable motive elements operable to rotate or otherwise drive the actuation member 282. The motive element 284 may also be implemented as a manual device, wherein the motive element 284 may be operable to permit a user to manually drive the actuation member 282 to laterally displace the support member 280.

Figure 15:
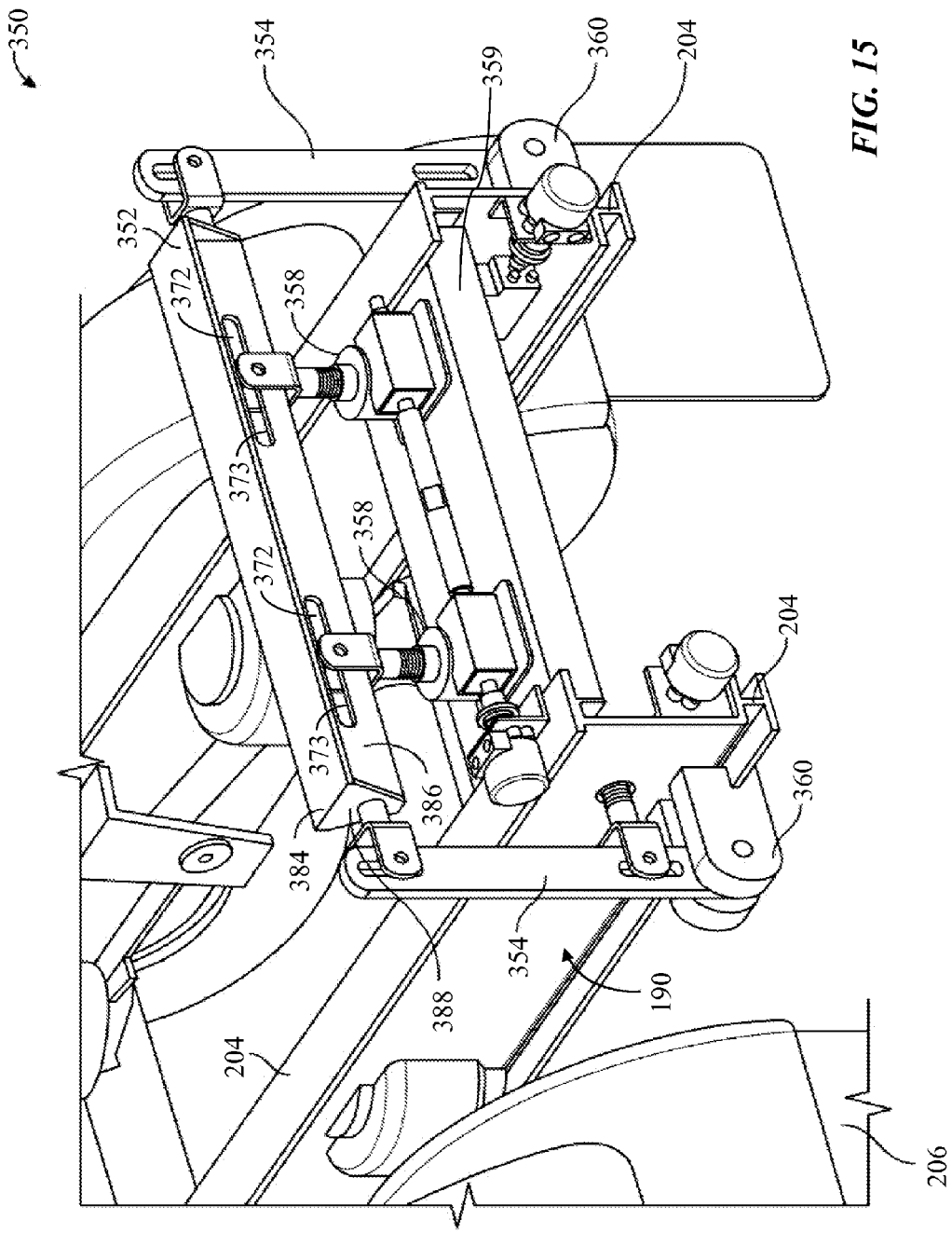
FIG. 15 is a perspective view of a portion of another implementation of the apparatus shown in FIG. 7 according to one or more aspects of the disclosure.
Figure 16:
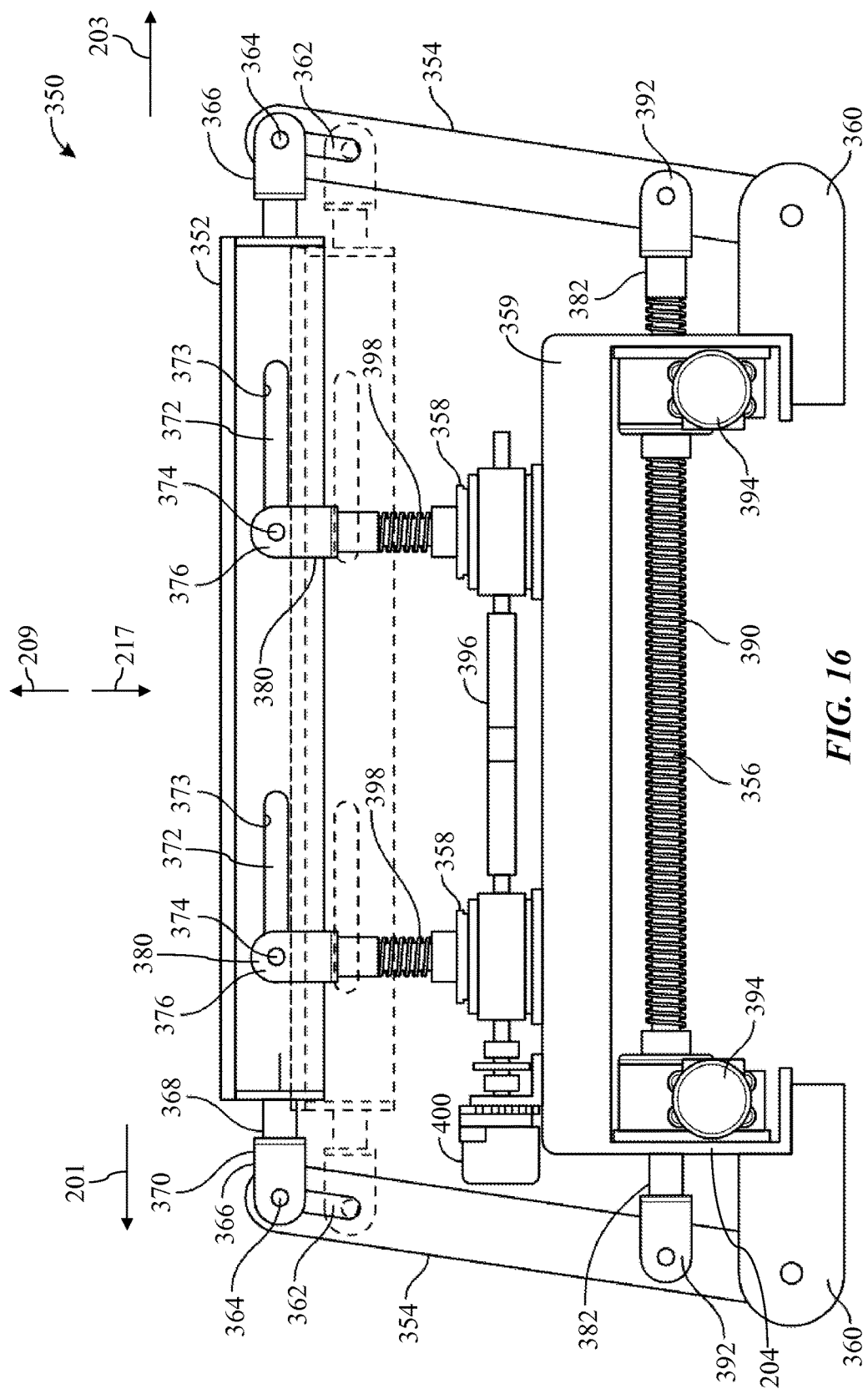
FIG. 16 is an elevation view of a portion of the apparatus shown in FIG. 15.
Figure 17:
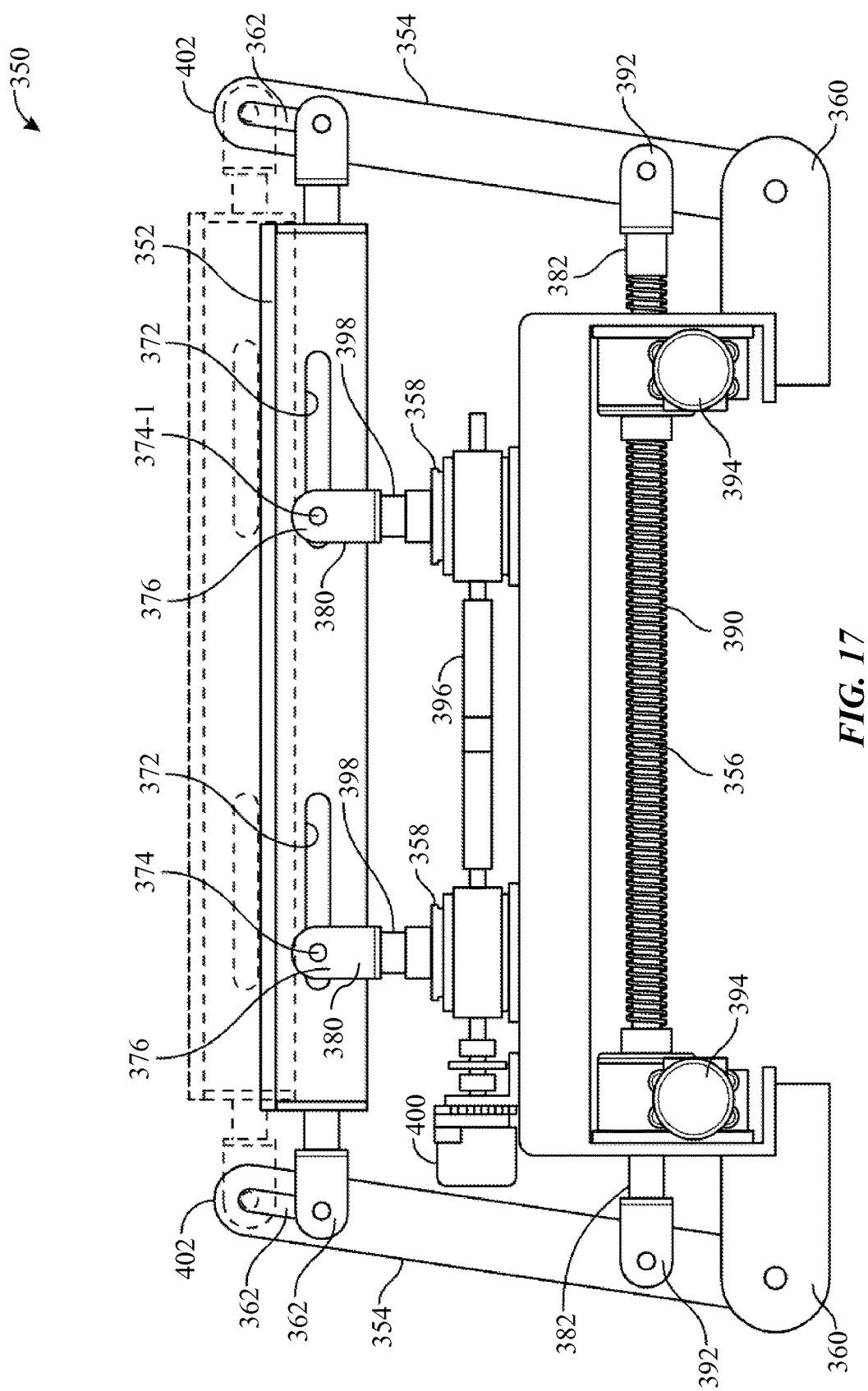
FIG. 17 is an elevation view of a portion of the apparatus shown in FIG. 16 in another stage of operation.

FIG. 15 is a perspective view of a portion of another example implementation of the silo support and alignment assemblies 214, 215 described above, and designated in FIG. 15 by reference numeral 350. FIG. 16 is an elevation view of a portion of the silo support and alignment assembly 350 shown in FIG. 15. FIG. 17 is an elevation view of a portion of the silo support and alignment assembly 350 shown in FIG. 16 in another stage of operation. One or both of the silo support and alignment assemblies 214, 215 described above may instead be the silo support and alignment assembly 350 shown in FIGS. 15-17, and the silo support and alignment assembly 350 shown in FIGS. 15-17 may be substantially similar in structure and/or function to the silo support and alignment assemblies 214, 215 described above, except as described below.

Referring to FIGS. 1, 7, and 15-17, collectively, the silo support and alignment assembly 350 may be operable to facilitate lateral (e.g., horizontal) movement or adjustment of the position of the cradle structure 194, the erecting mast 196, and/or the modular silo 18 on the chassis 190, as indicated by arrows 201, 203. The silo support and alignment assembly 350 may also be operable to facilitate vertical movement or adjustment of the position of the cradle structure 194, the erecting mast 196, and/or the modular silo 18 on the chassis 190, as indicated by arrows 209, 213. The silo support and alignment assembly 350 may comprise a horizontal support member 352, one or more vertical support members 354, a first actuation member 356, and one or more second actuation members 358. The horizontal support member 352 may be disposed underneath and/or coupled with the cradle structure 194, such as with the receiving member 314, to pivotably couple the cradle structure 194 with the chassis 190.

Although the silo support and alignment assembly 350 is shown comprising two vertical support members 354 and two second actuation members 358, it should be understood that the silo support and alignment assembly 350 may comprise another number of the vertical support members 354 and the second actuation members 358. The vertical support members 354 may be disposed on opposite sides of the support beams 204 of the chassis 190 and extend vertically with respect to the support beams 204. An upper portion of each vertical support member 354 may be coupled with the horizontal support member 352, and a lower portion of each vertical support member 354 may be coupled with the support beams 204 via pivot joints or tabs 360. The tabs 360 may be fixedly connected with the support beams 204 and pivotably or otherwise movably coupled with the vertical support members 354. Generally, the movable connections between the tabs 360, the vertical support members 354, and the horizontal support member 352 permit the horizontal support member 352 to move vertically and laterally relative to the support beams 204, as indicated by arrows 201, 203, 209, 213.

The vertical support members 354 may comprise vertically extending slots 362, such as may permit the vertical movement of the horizontal support member 352 relative to the support beams 204. Each of the slots 362 of the vertical support members 354 may contain therein a pin 364, such as may be operable to movably couple the horizontal support member 352 with the vertical support members 354. Each end of the horizontal support member 352 may comprise a connection assembly 366 extending therefrom. Each connection assembly 366 may comprise a shaft 368 connected to each opposing end of the horizontal support member 352 and a connection mechanism 370 connected to each shaft 368. Each connection mechanism 370 may be or comprise a C-shaped connector operable to receive and/or couple with each of the pins 364, and thus couple the horizontal support member 352 with the vertical support members 354.

The horizontal support member 352 may comprise one or more horizontally extending slots 372, such as may permit horizontal movement of the horizontal support member 352. The horizontal support member 352 may be movably coupled with the second actuation members 358 via pins 374 extending through each connection assembly 376 of the second actuation members 358 and through the slots 372 of the horizontal support member 352. Each connection assembly 376 may comprise a threaded shaft 398 extending between each second actuation member 358 and a connection mechanism 380. Each connection mechanism 380 may be a C-shaped connector operable to receive therein one of the pins 374 and, thereby, couple the second actuation members 358 with the horizontal support member 352.

The openings 372 may be or comprise beveled-edge slots. The openings 372 may be operable to receive therein portions of the connection mechanism 380, which instead of the pins 374, may comprise V-profile rollers (not shown), which may be similar to the V-profile rollers 290 described above. The openings 372 may be defined by beveled-edges or surfaces 373, which may be disposed on the rollers 290 or inserted within the V-profile of the rollers 290 to support the horizontal support member 352. Although the openings 372 may be implemented as elongated slots, it should be understood that the openings 372 may be implemented as elongated openings, circular openings, or openings of other suitable shapes, with or without beveled-edges.

The first actuation member 356 may be coupled with and/or extend through the support beams 204, and may be pivotably or movably coupled with the vertical support members 354. The first actuation member 356 may be coupled with the vertical support members 354 via connection assemblies 382, which may be implemented similarly to the connection assemblies 366 and 376. The first actuation member 356 may be operable to control the lateral or horizontal position of the horizontal support member 352 by pivoting or otherwise moving the angular position of the vertical support members 354 relative to the support beams 204. The second actuation members 358 may be coupled with the support beams 204 and may move the horizontal support member 352 within the slots 362 to control the vertical position of the horizontal support member 352 relative to the support beams 204. The phantom lines shown in FIGS. 16 and 17 depict an example vertical motion of the horizontal support member 352.

The horizontal support member 352 and the vertical support members 354 may comprise steel tubing, beams, or other suitable materials operable to maintain structural integrity during operations. The horizontal support member 352 may comprise a substantially T-shaped cross section having a support plate 384, a reinforcement member 386 connected to the support plate 384 and extending downwardly therefrom, and a plurality of end connection members 388 connected to at least one of the support plate 384 and the reinforcement member 386. Each of the plurality of end connection members 388 may comprise a triangular, trapezoidal, or other suitable configuration. The one or more horizontally extending slots 372 may extend through the reinforcement member 386 of the horizontal support member 352. (e.g. as shown in FIG. 15) In another example implementation, the horizontal support member 352 may be or comprise a substantially solid trapezoidal or triangular configuration, wherein the one or more horizontally extending slots 372 may be milled, cast within, cut, or otherwise defined within the horizontal support member 352. In another example implementation, the vertical support members 354 may comprise a plurality of plates, solid rectangular material, or other suitable materials, in addition to or instead of tubing or beams.

The first actuation member 356 may include a screw jack 390 having an end 392 pivotably or otherwise movably coupled with one of the vertical support members 354, and an opposing end 392 pivotably or otherwise movably coupled with the other one of the vertical support members 354. The first actuation member 356 may further comprise one or more actuators or motive elements 394, such as may actuate, rotate, or otherwise drive the screw jack 390. The motive elements 394 may be fixedly mounted to the support beams 204 and may comprise a suitable actuating device, such as a hydraulic motor, an electric motor, a solenoid, and/or another device operable to rotate or otherwise move the screw jack 390. Although two motive elements 394 are shown in FIGS. 15-17, another number of motive elements 394 may be included to operably drive the screw jack 390.

The second actuation members 358 may be supported by the support beams 204, disposed at a predetermined distance apart, and operatively coupled together by a mechanical linkage 396. The second actuation members 358 may be connected directly with the support beams 204 or with an intermediate support member 359 extending between and connected with the support beams 204. The silo support and alignment assembly 350 may further comprise another actuator or motive element 400 directly coupled with one of the second actuation members 358 and indirectly coupled with the other of the second actuation members 358 via the mechanical linkage 396. The motive element 400 may be operable to rotate or otherwise actuate the screw jacks 398 to move the connection assemblies 376, and thus the horizontal support member 352, in the vertical direction, as indicated by arrows 209, 213. The motive element 400, the second actuation members 358, the mechanical linkage 396, the screw jacks 398, the connection assemblies 376, and the pins 374 may collectively be referred to herein as a lifting mechanism. The motive element 400 may be or comprise the same or similar function and/or configuration as the motive elements 394 described above.

As shown in FIG. 17, when the second actuation members 358 lower the horizontal support member 352, upper ends 402 of the vertical support members 354 may be disposed above the horizontal support member 352. To accommodate the upper ends 402, the cradle structure 194 may comprise openings or slots (not shown) to avoid interfering with or otherwise engaging the vertical support members 354.

FIG. 18 is an elevation view of a portion of another example implementation of the silo support and alignment assemblies 214, 215, 350 described above, and designated in FIG. 18 by reference numeral 355. FIGS. 19 and 20 are end and side views, respectively, of a portion of the silo support and alignment assembly 355 shown in FIG. 18. One or more of the silo support and alignment assemblies 214, 215, 350 described above may instead be the silo support and alignment assembly 355 shown in FIGS. 18-20, and the silo support and alignment assembly 355 shown in FIGS. 18-20 may be substantially similar in structure and/or function to the silo support and alignment assemblies 214, 215, 350 described above, except as described below.

Referring to FIGS. 18-20, collectively, the silo support and alignment assembly 355 comprises a single vertical support member 353 coupled with the horizontal support member 352 between opposing ends of the horizontal support member 352. The vertical support member 353 may be coupled with the horizontal support member 352 via a pin 365 extending outwardly from the horizontal support member 352 and through a slot 363 extending through the vertical support member 353. In another example implementation, the pin 365 may comprise a separate discrete member extending through a hole (not shown) in the horizontal support member 352. The vertical support member 353 may comprise a threaded hole 371 extending through a lower portion of the vertical support member 353, such as may be operable to threadedly engage the first actuation member 356. The threaded hole 371 may be oriented perpendicularly to the slot 363. The vertical support member 353 may further comprise a channel 373 extending therethrough perpendicularly to the slot 363 and/or parallel to the threaded hole 371.

Figure 21:
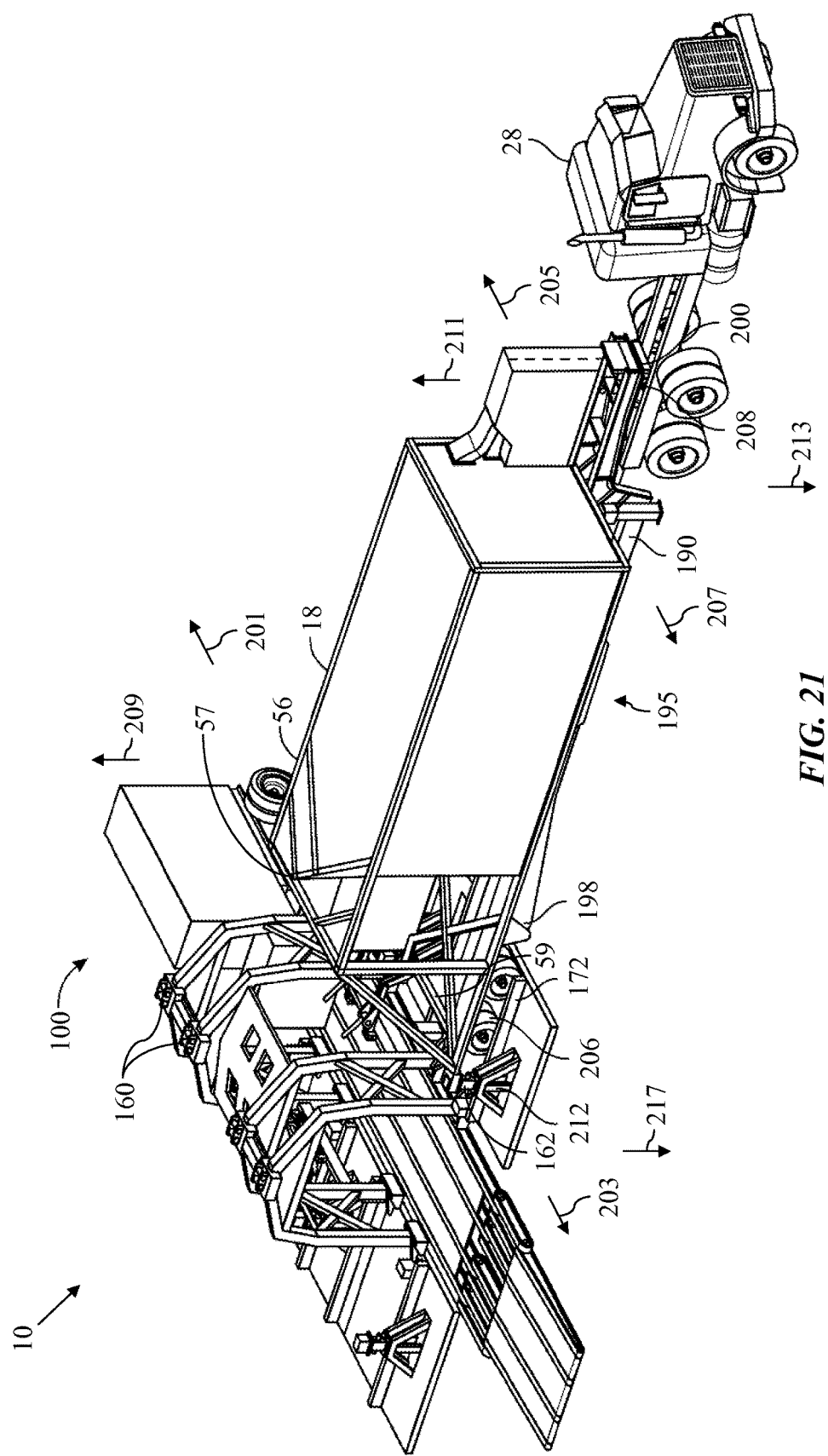
FIG. 21 is a perspective view of the apparatus shown in FIGS. 1 and 7 in another stage of operation.
Figure 22:
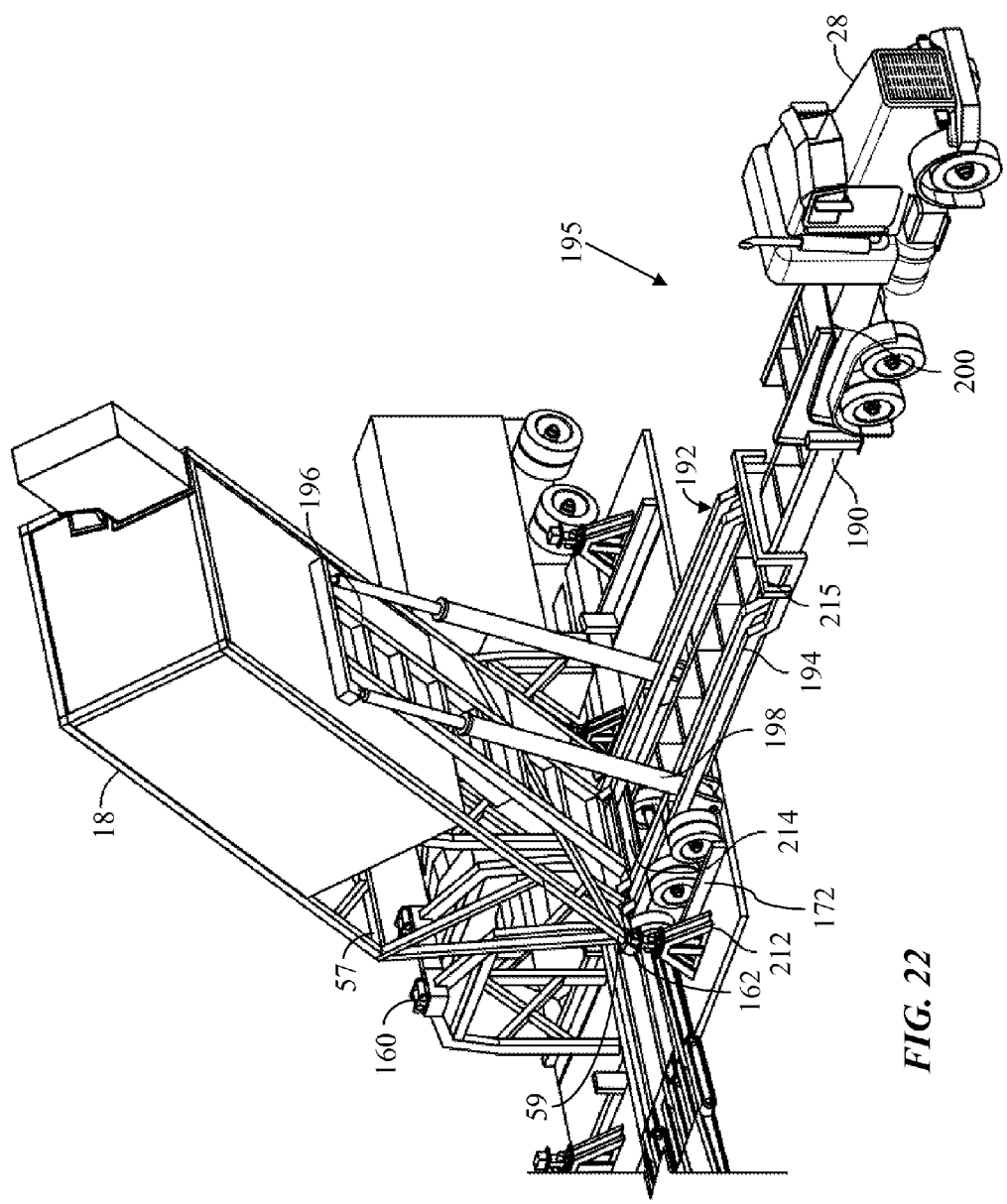
FIG. 22 is a perspective view of the apparatus shown in FIG. 21 in another stage of operation.
Figure 23:
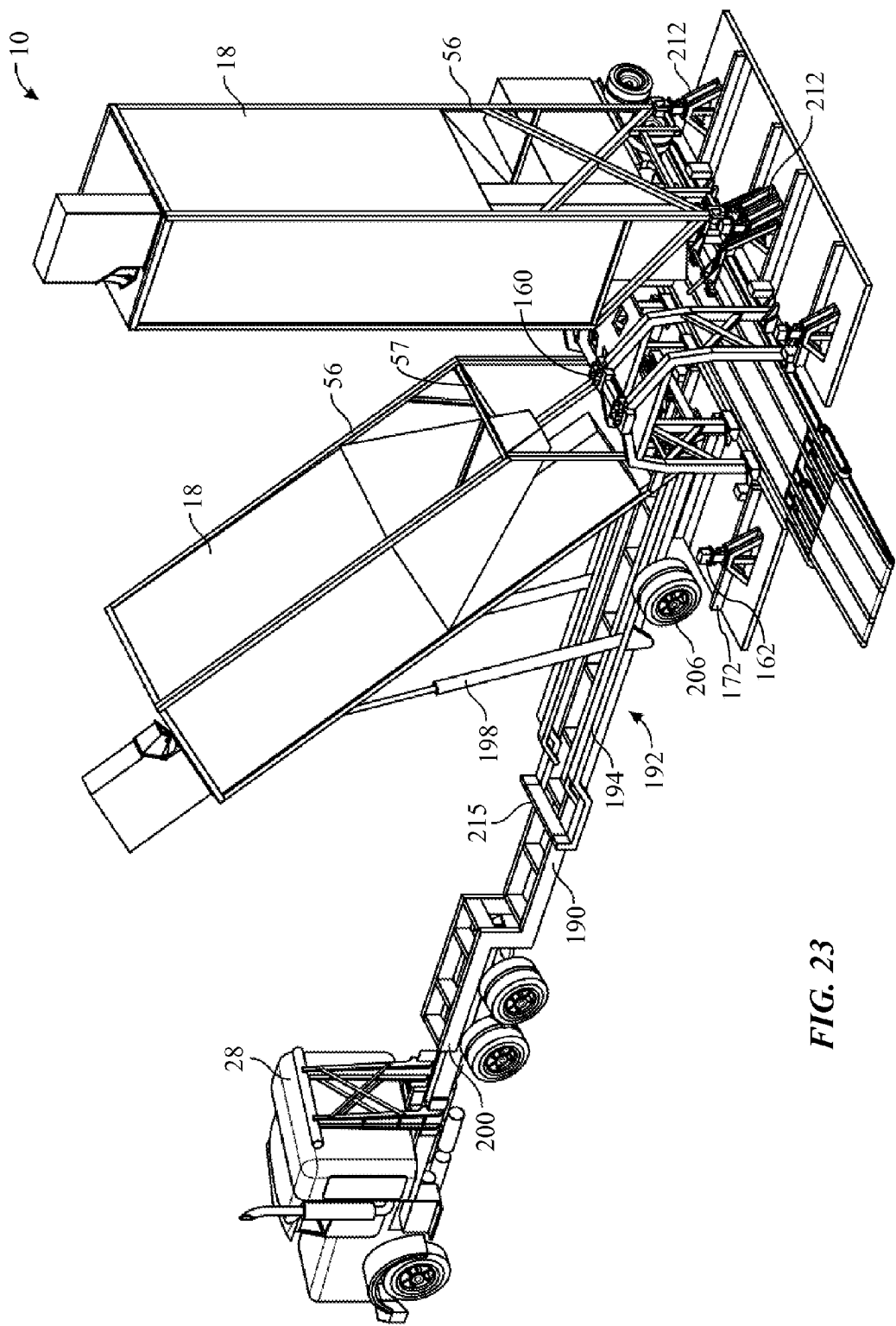
FIG. 23 is a perspective view of the apparatus shown in FIG. 21 in another stage of operation.

FIG. 21 is a perspective view of the proppant delivery system 10 shown in FIG. 1 and the silo delivery system 195 shown in FIG. 7 in another stage of operation. FIG. 22 is a perspective view of the proppant delivery system 10 and the silo delivery system 195 shown in FIG. 21 in another stage of operation. FIG. 23 is a perspective view of the proppant delivery system 10 and the silo delivery system 195 shown in FIG. 21 in another stage of operation. Referring to FIGS. 21-23, collectively, the figures show the proppant delivery system 10 as the modular silos 18 are installed onto the MSS 100. In an example implementation, the modular silo 18 may be disposed on the silo delivery system 195 comprising the erector assembly 192 disposed on the chassis 190, as described above. The first end 200 of the chassis 190 may be operably connected to the truck 28. The chassis 190 may be backed up or otherwise moved toward the MSS 100, such that a portion of the chassis 190 and/or modular silo 18 and a portion of the MSS 100 overlap. The modular silo 18 and MSS 100 may then be substantially aligned, such as may permit connection between the modular silo 18 and the MSS 100. Thereafter, a first portion 59 of the modular silo frame 56 may be connected with the second set of connectors 162. The modular silo 18 may then be pivoted or otherwise raised until a second portion 57 of the modular silo frame 56 connects with the first set of connectors 160. Once the silo frame 56 is connected with the first and second sets of connectors 160, 162, the modular silo 18 is erected to the operational configuration on the MSS 100.

The modular silo delivery system 195 may further comprise the cradle structure 194 and one or more silo support and alignment assemblies 214, 215 coupling the cradle structure 194 with the chassis 190. The chassis 190 may be backed up toward the MSS 100 until the modular silo 18 and a portion of the MSS 100 overlap and the wheels 206 are disposed between the wheel alignment guides 172. Thereafter, using the one or more silo support and alignment assemblies 214, 215, 350, 355, the modular silo 18 may be moved laterally with respect the chassis 190 and/or the MSS 100 along a horizontal plane, as indicated by arrows 201, 203, 205, 207, until a portion of the modular silo frame 56 is substantially aligned with a portion of the MSS 100. For example, as the silo support and alignment assembly 214 may couple the cradle structure 194 with the chassis 190, the silo support and alignment assembly 214 may be utilized, as described above, to move the cradle structure 194, and thus the modular silo 18, laterally relative to the chassis 190, as indicated by arrows 201, 203. Moving the modular silo 18 laterally may compensate for horizontal misalignment of the modular silo 18 with respect to the MSS 100 without reorienting or moving the chassis 190. For example, the silo support and alignment assembly 214 may laterally move the modular silo 18 until the first portion 59 of the silo frame 56 is directly above or otherwise substantially aligned with the second set of connectors 162 disposed on corresponding sets of struts 212. As depicted in FIG. 11, the first portion 59 of the silo frame 56 may comprise support shafts 55, which may be operable for insertion into and/or connection with the second set of connectors 162 of the MSS 100. After aligning for such insertion, the actuator assembly 198 may be actuated to pivot or move the modular silo 18, which may be coupled with the erecting mast 196 of the silo delivery system 195, in the upward direction from the transportation configuration.

In implementations in which the modular silo delivery system 195 comprises one or more of the silo support and alignment assemblies 350, 355 coupling the cradle structure 194 with the chassis 190, the chassis 190 may be moved toward the MSS 100 until the modular silo 18 and a portion of the MSS 100 overlap and the wheels 206 are disposed between the wheel alignment guides 172. Thereafter, using the one or more one silo support and alignment assemblies 350, 355, the modular silo 18 may be moved laterally and vertically with respect the chassis 190 and/or the MSS 100, as indicated by arrows 201, 203, 205, 207, 209, 211, 213, 217, until a portion of the modular silo frame 56 is substantially aligned with a portion of the MSS 100. As the silo support and alignment assembly 350 may couple the cradle structure 194 with the chassis 190, the one or more silo support and alignment assemblies 350, 355 may be utilized, as described above, to move the cradle structure 194, and thus the modular silo 18, laterally and vertically relative to the chassis 190 and/or the MSS 100. Moving the modular silo 18 laterally and vertically may compensate for horizontal and vertical misalignment of the modular silo 18 with respect to the MSS 100 without reorienting or moving the chassis 190. For example, one of the silo support and alignment assemblies 350, 355 may laterally and vertically move the modular silo 18, as indicated by arrows 201, 203, 209, 217, until the first portion 59 of the silo frame 56 is directly above or otherwise substantially aligned with the second set of connectors 162 disposed on corresponding sets of struts 212. As depicted in FIG. 11, the first portion 59 of the silo frame 56 may comprise the support shafts 55, which may be operable for insertion into and/or connection with the second set of connectors 162 of the MSS 100. After alignment for such connection is established, the actuator assembly 198 may be actuated to pivot or move the modular silo 18, which may be coupled with the erecting mast 196 of the silo delivery system 195, in the upward direction from the transportation configuration.

The above-described method may be repeated to install additional modular silos 18. The above-described method may also be performed in reverse order to uninstall the modular silos 18 from the MSS 100.

In view of the entirety of the present disclosure, including the figures and the claims, a person having ordinary skill in the art will readily recognize that the present disclosure introduces an apparatus comprising: a chassis; a base movably coupled with the chassis; a mast pivotably connected with the base and supporting an oilfield material container in a transport orientation; a first actuator operable to pivot the mast and the oilfield material container from the transport orientation to an operational orientation; and a second actuator operable to move the base, and thus the mast and the oilfield material container, relative to the chassis.

The chassis may be a mobile chassis operable for connection with a vehicle.

The chassis may comprise an axis extending longitudinally along the chassis, and the second actuator may be operable to move the base in a lateral direction with respect to the axis, wherein the lateral direction may be substantially horizontal. The second actuator may be disposed adjacent a first end of the base, and may be operable to move at least a first portion of the base, and thus the mast and the oilfield material container, in the lateral direction. In such implementations, the apparatus may further comprise a third actuator disposed adjacent a second end of the base and operable to move at least a second portion of the base, and thus the mast and the oilfield material container, in the lateral direction. The apparatus may further comprise a fourth actuator operable to move at least the first portion of the base, and thus the mast and the oilfield material container, in a substantially vertical direction relative to the chassis. The fourth actuator may be disposed adjacent the first end of the base. The apparatus may further comprise a fifth actuator disposed adjacent the second end of the base and operable to move at least the second portion of the base, and thus the mast and the oilfield material container, in the substantially vertical direction relative to the chassis.

The apparatus may further comprise a first support member coupled with the chassis and the base. The first support member may be operatively coupled with the second actuator, and the second actuator may be operable to move the first support member, and thus at least a first portion of the base, in the lateral direction. The apparatus may further comprise a second support member coupled with the chassis and the base. The second support member may be operatively coupled with a third actuator, and the third actuator may be operable to move the second support member, and thus at least a second portion of the base, in the lateral direction. The first and second support members may be pivotably coupled with the base, and the second and third actuators may be further operable to pivot the base, and thus the mast and the oilfield material container, along a substantially horizontal plane.

The first support member may extend laterally with respect to the axis of the chassis. The first support member may comprise a support surface extending laterally with respect to the axis of the chassis, and the support surface may engage a roller coupled with the chassis to permit the first support member to move relative to the chassis in the lateral direction. The apparatus may further comprise a first lifting mechanism coupled with the roller and the chassis. The first lifting mechanism may comprise a fourth actuator operable to move the roller, and thus the first support member, the mast, and the oilfield material container, in a substantially vertical direction relative to the chassis.

The first support member may be pivotably coupled with the base, and the second actuator may be further operable to pivot the base, and thus the mast and the oilfield material container, along a substantially horizontal plane.

The apparatus may further comprise a first lifting mechanism coupled with the first support member and the chassis. The first lifting mechanism may comprise a fourth actuator operable to move the first support member, and thus the mast and the oilfield material container, in a substantially vertical direction relative to the chassis.

The present disclosure also introduces a method comprising: connecting an oilfield material container to a mast, wherein the mast is pivotably connected with a base, and wherein the base is movably coupled with a chassis; operating a first actuator to move the base, and thus the mast and the oilfield material container, relative to the chassis; and operating a second actuator to pivot the mast and the oilfield material container from a transport orientation to an operational orientation.

The method may further comprise transporting the chassis, the base, the mast, and the oilfield material container in the transport orientation to a predetermined location with a vehicle.

Operating the first actuator to move the base, and thus the mast and the oilfield material container, relative to the chassis may comprise operating the first actuator to move the base, and thus the mast and the oilfield material container, in a lateral direction relative to the chassis, wherein the lateral direction is substantially horizontal. The method may further comprise operating a third actuator to move the base, and thus the mast and the oilfield material container, in a substantially vertical direction relative to the chassis. The method may further comprise transporting the chassis, the base, the mast, and the oilfield material container in the transport orientation to a predetermined location adjacent to a material container support structure, wherein operating the first actuator to move the base, and thus the mast and the oilfield material container, in the lateral direction may align the oilfield material container with at least a portion of the material container support structure.

Operating the first actuator to move the base, and thus the mast and the oilfield material container, relative to the chassis may comprise operating the first actuator to move a first end of the base, and thus a first end of the mast and the oilfield material container, in the lateral direction, and the method may further comprise operating a third actuator to move a second end of the base, and thus a second end of the mast and the oilfield material container, in the lateral direction. The lateral direction may be a first lateral direction, and the method may further comprise operating the first actuator to move the first end of the base in the first lateral direction and operating the third actuator to move the second end of the base in a second lateral direction to pivot the base, and thus the mast and the oilfield material container, in a rotational direction along a substantially horizontal plane, wherein the second lateral direction may be opposite the first lateral direction. The lateral direction may be a first lateral direction, and the method may further comprise operating the first actuator to move the first end of the base in the first lateral direction and operating the third actuator to move the second end of the base in the first lateral direction to translate the base, and thus the first end of the mast and the oilfield material container, in the first lateral direction.

The method may further comprise: operating a fourth actuator to move the first end of the base, and thus the first end of the mast and the oilfield material container, in a substantially vertical direction relative to the chassis; and operating a fifth actuator to move the second end of the base, and thus the second end of the mast and the oilfield material container, in the substantially vertical direction relative to the chassis.

The present disclosure also introduces an apparatus comprising: a chassis; a mast movably coupled with the chassis and supporting an oilfield material container; a first actuator operable to pivot the mast, and thus the oilfield material container, with respect to the chassis in a substantially vertical plane; and a second actuator operable to move the mast, and thus the oilfield material container, in a substantially horizontal plane.

The chassis may be a mobile chassis operable for transportation.

The apparatus may further comprise a base movably coupled with the chassis. The mast may be pivotably coupled with the base.

The second actuator may be disposed adjacent a first end of the chassis, and the apparatus may further comprise a third actuator disposed adjacent a second end of the chassis. The third actuator may be operable to laterally move the mast, and thus the oilfield material container, in the substantially horizontal plane.

The apparatus may further comprise a third actuator operable to move the mast, and thus the oilfield material container, in a substantially vertical direction relative to the chassis.

The apparatus may further comprise a first support member coupled with the chassis and the mast, the first support member may be operatively coupled with the second actuator, and the second actuator may be operable to move the first support member, and thus the mast and the oilfield material container, in a substantially horizontal direction. The apparatus may further comprise a second support member coupled with the chassis and the mast, the second support member may be operatively coupled with a third actuator, and the third actuator may be operable to move the second support member, and thus the mast and the oilfield material container, in the lateral direction. The first support member may be pivotably coupled with the mast, and the second actuator may be further operable to pivot the mast, and thus the oilfield material container, relative to the chassis along the substantially horizontal plane. The first support member may extend laterally with respect to the chassis, the first support member may comprise a support surface extending laterally with respect to the chassis, and the support surface may engage a roller coupled with the chassis to permit the first support member to move relative to the chassis in the lateral direction. The apparatus may further comprise a first lifting mechanism coupled with the roller and the chassis, and the first lifting mechanism may comprise a fourth actuator operable to move the roller, and thus the first support member, the mast, and the oilfield material container, in a substantially vertical direction relative to the chassis.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method, comprising:
   connecting an oilfield material container to a mast, wherein the mast is pivotably connected with a base, and wherein the base is movably coupled with a chassis;
   operating a first actuator to move the base, and thus the mast and the oilfield material container, in a lateral direction relative to the chassis, wherein the lateral direction is substantially horizontal; and
   operating a second actuator to pivot the mast and the oilfield material container from a transport orientation to an operational orientation.

2. The method of claim 1 further comprising operating a third actuator to move the base, and thus the mast and the oilfield material container, in a substantially vertical direction relative to the chassis.

3. The method of claim 1 further comprising transporting the chassis, the base, the mast, and the oilfield material container in the transport orientation to a predetermined location adjacent to a material container support structure, wherein operating the first actuator to move the base, and thus the mast and the oilfield material container, in the lateral direction aligns the oilfield material container with at least a portion of the material container support structure.

4. The method of claim 1 wherein operating the first actuator to move the base, and thus the mast and the oilfield material container, relative to the chassis comprises operating the first actuator to move a first end of the base, and thus a first end of the mast and the oilfield material container, in the lateral direction, and wherein the method further comprises operating a third actuator to move a second end of the base, and thus a second end of the mast and the oilfield material container, in the lateral direction.

5. The method of claim 4 wherein the lateral direction is a first lateral direction, wherein the method further comprises operating the first actuator to move the first end of the base in the first lateral direction and operating the third actuator to move the second end of the base in a second lateral direction to pivot the base, and thus the mast and the oilfield material container, in a rotational direction along a substantially horizontal plane, wherein the second lateral direction is opposite the first lateral direction.

6. The method of claim 4 wherein the lateral direction is a first lateral direction, wherein the method further comprises operating the first actuator to move the first end of the base in the first lateral direction and operating the third actuator to move the second end of the base in the first lateral direction to translate the base, and thus the first end of the mast and the oilfield material container, in the first lateral direction.

7. The method of claim 4 further comprising:
operating a fourth actuator to move the first end of the base, and thus the first end of the mast and the oilfield material container, in a substantially vertical direction relative to the chassis; and
operating a fifth actuator to move the second end of the base, and thus the second end of the mast and the oilfield material container, in the substantially vertical direction relative to the chassis.

* * * * *